United States Patent [19]

Asada et al.

[11] Patent Number: 5,562,086
[45] Date of Patent: Oct. 8, 1996

[54] CONTROL DEVICE OF A VARABLE CYLINDER ENGINE

[75] Inventors: Toshiaki Asada, Mishima; Toyokazu Baika, Susono; Kazuhiro Iwahashi, Susono; Akihiro Yamanaka, Susono, all of Japan

[73] Assignee: Toyota Jidosha Kabushiki Kaisha, Japan

[21] Appl. No.: 520,343

[22] Filed: Aug. 28, 1995

[30] Foreign Application Priority Data

Sep. 1, 1994 [JP] Japan .................................. 6-208762

[51] Int. Cl.⁶ ............................ F02D 17/02; F02M 25/07
[52] U.S. Cl. ................................. 123/571; 123/198 F
[58] Field of Search ........................... 123/198 F, 399, 123/481, 568, 571

[56] References Cited

U.S. PATENT DOCUMENTS

| | | | |
|---|---|---|---|
| 4,313,406 | 2/1982 | Iizuka et al. | 123/568 |
| 4,365,598 | 12/1982 | Sugasawa | 123/198 F |
| 4,391,240 | 7/1983 | Sugasawa et al. | 123/568 |
| 4,393,827 | 7/1983 | Schmid | 123/198 F |
| 4,455,984 | 6/1984 | Merlini et al. | 123/481 |
| 4,467,758 | 8/1984 | Ueno et al. | 123/198 F |
| 4,483,288 | 11/1984 | Ueno et al. | 123/198 F |
| 4,485,776 | 12/1984 | Mokuya et al. | 123/198 F |
| 4,485,777 | 12/1984 | Nakagami et al. | 123/198 F |
| 5,267,541 | 12/1993 | Taguchi et al. | 123/198 F |
| 5,398,544 | 3/1995 | Lipinski et al. | 123/198 F |
| 5,431,139 | 7/1995 | Grutter et al. | 123/198 F |
| 5,447,133 | 9/1995 | Kamio et al. | 123/198 F |

FOREIGN PATENT DOCUMENTS

| | | |
|---|---|---|
| 56-157359 U | 11/1981 | Japan . |
| 59-39738 U | 3/1984 | Japan . |
| 59-152155 U | 10/1984 | Japan . |

OTHER PUBLICATIONS

Toyota Technical Publication No. 5006, Nov. 30, 1993 pp. 155–156.

*Primary Examiner*—Willis R. Wolfe
*Attorney, Agent, or Firm*—Kenyon & Kenyon

[57] ABSTRACT

A control device of an engine having cylinders which are divided into two cylinder groups. The first cylinder group is provided with a first throttle valve and a first recirculation valve. The second cylinder group is provided with a second throttle valve and a second recirculation valve. When shifting from full cylinder operation to partial cylinder operation where the second cylinder group is left idle, the sum of the load of both the cylinder groups is maintained as substantially the same load as the total load before shifting to the partial cylinder operation, the first throttle valve is gradually opened, and the second throttle valve is gradually closed.

14 Claims, 22 Drawing Sheets

CONTROL DEVICE OF A VARABLE CYLINDER ENGINE

BACKGROUND OF THE INVENTION

1. Field of the Invention

The present invention relates to a control device of a variable cylinder engine.

2. Description of the Related Art

Known in the art is a variable cylinder engine designed so that the cylinders are divided into a first cylinder group and a second cylinder group, a first intake manifold connected to the first cylinder group and a second intake manifold connected to the second cylinder group are connected to a common intake passage, a throttle valve is disposed in that common intake passage and an intake cutoff valve is disposed in the inlet portion of the second intake manifold, the intake cutoff valve is fully opened when all the cylinders are to be operated, and the intake cutoff valve is closed to cause the inflow of intake air to the second cylinder group to stop and the supply of fuel to the second cylinder group is made to stop when the second cylinder group is to be made idle and partial cylinder operation engaged in (see Japanese Unexamined Utility Model Publication (Kokai) No. 59-152155).

With this engine, however, sufficient consideration was not given to the rapid changes in the engine output torque caused by the switching operation of the intake cutoff valve when shifting from full cylinder operation to partial cylinder operation or when shifting from partial cylinder operation to full cylinder operation and therefore there was the problem that the engine suffered from rapid changes in the engine output torque when the number of operating cylinders was changed.

SUMMARY OF THE INVENTION

An object of the present invention is to provide a control device of a variable cylinder engine capable of suppressing the fluctuations of the output torque of the engine at the time of switching between full cylinder operation and partial cylinder operation.

According to the present invention, there is provided a control device of an engine in which cylinders of the engine are divided into a first cylinder group and a second cylinder group, each of the cylinder groups is made to operate when full cylinder operation is to be performed, and one of the cylinder groups is made to operate and the remaining cylinder group is made idle when partial cylinder operation is to be performed, said control device comprising: first intake air control means for controlling the amount of intake air supplied to the first cylinder group; second intake air control means for controlling the amount of intake air supplied to the second cylinder group, the first intake air control means and the second intake air control means maintaining the sum of the load of the first cylinder group and the load of the second cylinder group at a load substantially equal to the total load of all of the cylinders just before shifting to a partial cylinder operation, gradually increasing the amount of intake air supplied to the first cylinder group, gradually reducing the amount of intake air supplied to the second cylinder group when shifting from full cylinder operation to a partial cylinder operation in which the second cylinder group is made idle; and operation control means for idling the second cylinder group when the load of the second cylinder group falls below a predetermined load after the shifting operation from the full cylinder operation to the partial cylinder operation is started.

The present invention may be more fully understood from the description of preferred embodiments of the invention set forth below, together with the accompanying drawings.

DESCRIPTION OF PREFERRED EMBODIMENTS

Figure 1:
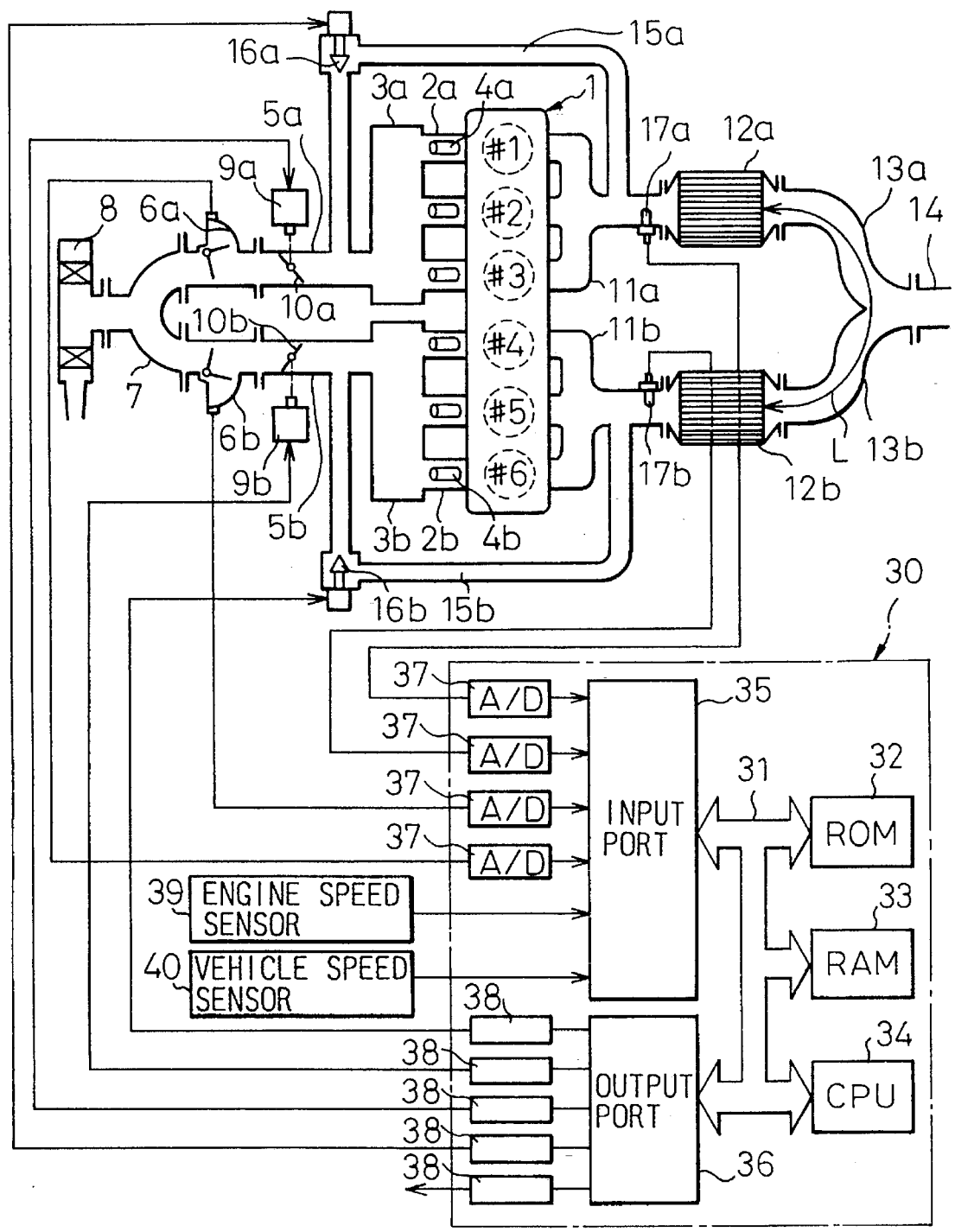
FIG. 1 is an overview of an internal combustion engine.

In FIG. 1, reference numeral 1 shows an engine having six cylinders, that is, the #1 cylinder to the #6 cylinder. The firing order of the engine 1 is 1-5-3-6-2-4. In the embodiment shown in FIG. 1, the six-cylinder engine is divided into the cylinder group 1 comprised of the #1 cylinder, the #2 cylinder, and the #3 cylinder with a firing order of every other cylinder and the cylinder group 2 comprised of the #4 cylinder, #5 cylinder, and #6 cylinder with a firing order of every other cylinder.

The cylinders of the cylinder group 1 are connected through corresponding intake branch pipes 2a to a first surge tank 3a. In each intake branch pipe 2a is disposed a first fuel injector 4a. The first surge tank 3a is connected through a first intake duct 5a to a first air flow meter 6a. On the other hand, the cylinders of the cylinder group 2 are connected through corresponding intake branch pipes 2b to a second surge tank 3b. In each intake branch pipe 2b is disposed a second fuel injector 4b. The second surge tank 3b is connected through a second intake duct 5b to a second air flow meter 6b. The inlet side of the first air-flow meter 6a and the inlet side of the second air-flow meter 6b are connected through a common intake duct 7 to an air cleaner 8. In the first intake duct 5a is disposed a first throttle valve 10a driven by a first drive motor 9a, while in the second intake duct 5b is disposed a second throttle valve 10b driven by a second drive motor 9b.

On the other hand, each cylinder of the cylinder group 1 is connected through a corresponding first exhaust manifold 11a to a first three-way catalytic converter 12a, while each cylinder of the cylinder group 2 is connected to a corresponding second exhaust manifold 11b to a second three-way catalytic converter 12b. The outlet side of the first three-way catalytic converter 12a and the outlet side of the second three-way catalytic converter 12b are connected through a corresponding first exhaust pipe 13a and second exhaust pipe 13b to a common exhaust pipe 14. The converging portion of the first exhaust manifold 11a and the first intake duct 5a downstream of the first throttle valve 10a are connected with each other through a first recirculated gas passage 15a. In the first recirculated gas passage 15a is disposed a first recirculation valve 16a. Further, at the converging portion of the first exhaust manifold 11a is disposed a first air-fuel ratio sensor 17a. On the other hand, the converging portion of the second exhaust manifold 11b and the second intake duct 5b downstream of the second throttle valve 10b are connected with each other through a second recirculated gas passage 15b. In the second recirculated gas passage 15b is disposed a second recirculation valve 16b. Further, at the converging portion of the second exhaust manifold 11b is disposed a second air-fuel ratio sensor 17b.

The electronic control unit 30 is comprised of a digital computer and is provided with a ROM (read only memory) 32, RAM (random access memory) 33, CPU (microcomputer) 34, input port 35, and output port 36 connected with each other by a bidirectional bus 31. The first air-flow meter 6a generates an output voltage proportional to the amount of the intake air supplied to the cylinder group 1. This output voltage is input through a corresponding AD converter 37 to the input port 35. The second air-flow meter 6b generates an output voltage proportional to the amount of the intake air supplied to the cylinder group 2. This output voltage is input through a corresponding AD converter 37 to the input port 35. The air-fuel ratio sensors 17a and 17b generate output voltages showing whether the air-fuel ratios of the air-fuel mixtures supplied to the corresponding cylinder groups are lean or rich. These output voltages are input through the corresponding AD converters 37 to the input port 35. Further, the input port 35 is connected to an engine speed sensor 39 which generates an output pulse showing the engine speed and a vehicle speed sensor 40 which generates an output pulse showing the vehicle speed. On the other hand, the output port 36 is connected through the corresponding drive circuits 38 to the fuel injectors 4a and 4b, the drive motors 9a and 9b, and the recirculation valves 16a and 16b.

In this embodiment according to the present invention, during full cylinder operation where all of the cylinders of the cylinder group 1 and the cylinder group 2 are to be driven, the first throttle valve 10a and the second throttle valve 10b are opened by the same degree. Further, at this time, the degree of opening of the first throttle valve 10a and the degree of opening of the second throttle valve 10b are increased in proportion to the amount of depression of the accelerator pedal (not shown) by the corresponding drive motors 9a and 9b. Further, at this time, the cylinder group 1 and the cylinder group 2 are supplied through the corresponding recirculated gas passages 15a and 15b with recirculated exhaust gas (hereinafter referred to as "EGR gas"). Further, the amounts of the basic fuel injections from the fuel injectors 4a and 4b to the cylinder group 1 and the cylinder group 2 are determined for each cylinder group from the amount of intake air and the engine speed detected by the corresponding air-flow meters 6a and 6b. Further, the basic fuel injection times are corrected so that the air-fuel ratios of the air-fuel mixtures supplied to the cylinder group 1 and the cylinder group 2 become the stoichiometric air-fuel ratios based on the output signals of the corresponding air-fuel ratio sensors 17a and 17b.

On the other hand, when partial cylinder operation is to be performed, either the fuel injection to the cylinder group 1 is suspended and the cylinder group 1 is made idle or the fuel injection to the cylinder group 2 is suspended and the cylinder group 2 is made idle. Further, when partial cylinder operation is to be continued over a long period, the cylinder group 1 and the cylinder group 2 are alternately made idle. That is, if one cylinder group is allowed to be idle for a long period, the temperature of the cylinders in that cylinder group will fall during that time and as a result a good combustion will not be able to be immediately obtained when trying to operate them again. Accordingly, when partial cylinder operation is to be continued over a long period, the cylinder group 1 and the cylinder group 2 are alternately made idle so that the temperatures of the cylinders of the idle cylinder group do not fall too much during the idle period.

During idling, the throttle valves 10a and 10b of the idle cylinder group are closed or are maintained at a small degree of opening. On the other hand, the recirculation valves 16a and 16b of the idle cylinder group are made to be opened wide. Therefore, recirculated gas is supplied to the idle cylinder group from the corresponding recirculated gas passages 15a and 15b. The majority of the recirculated gas is comprised of air. There are three reasons for causing recirculation of recirculated gas to the idle cylinder group in this way. The first reason is that recirculating recirculated gas to the idle cylinder group reduces the negative pressure in the surge tanks 3a and 3b of the idle cylinder group and thereby reduces the pumping loss of the idle cylinder group. The second reason is that recirculating the gas exhausted into the exhaust manifolds 11a and 11b of the idle cylinder group to the surge tanks 3a and 3b reduces the amount of gas flowing into the three-way catalytic converters 12a and 12b of the idle cylinder group and thereby prevents the temperature of the three-way catalysts in the three-way catalytic converters 12a and 12b from falling below the activation temperature where excellent purification is obtained.

Figure 2:
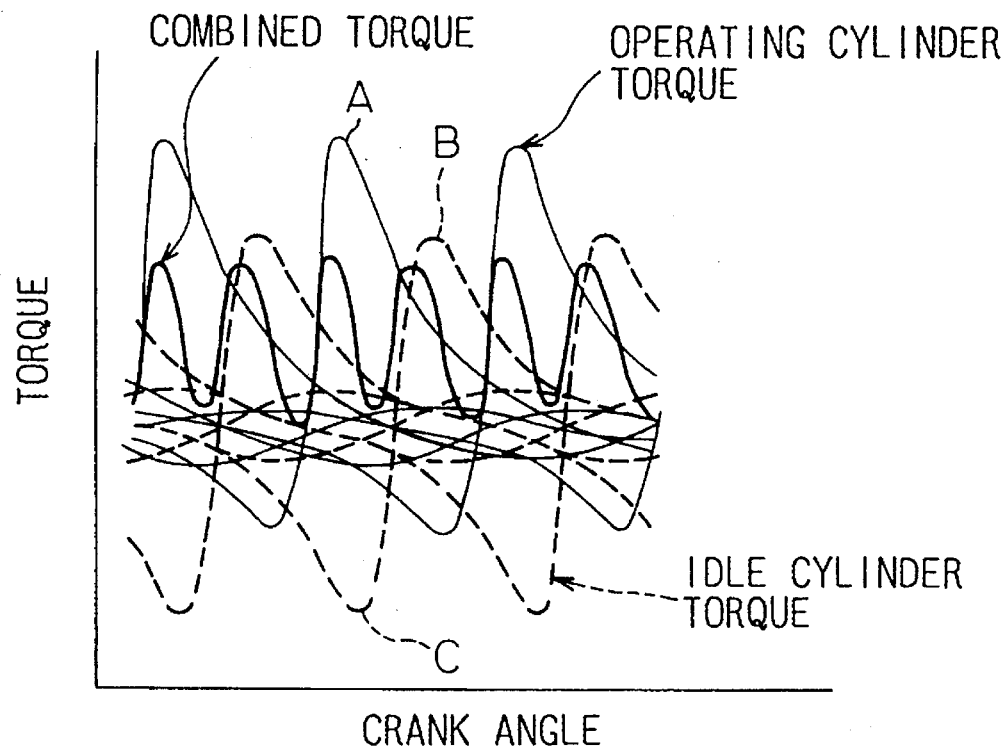
FIG. 2 is a view of the fluctuations in output torque.

The third reason is the reduction of the level of vibration of the engine during the partial cylinder operation. This is the most important. That is, during partial cylinder operation, the combustion is performed at every other cylinder, so the degree of fluctuation of the engine output torque becomes great and therefore the level of engine vibration also becomes large. However, if the amount of recirculated gas of the idle cylinder group is increased and, as shown by the broken line in FIG. 2, the negative torque peak C before the top dead center of compression is made larger and the positive torque peak B after the top dead center of compression is made larger, the negative torque peak C cancels out the positive torque peak A caused by the explosions in the operating cylinder group and therefore, as shown in FIG. 2, the amplitude of the combined torque resulting from the torque produced by the operating cylinder group and the torque produced by the idle cylinder group becomes smaller. As a result, the level of engine vibration becomes smaller and therefore it is possible to suppress the occurrence of engine vibration.

Figure 3:
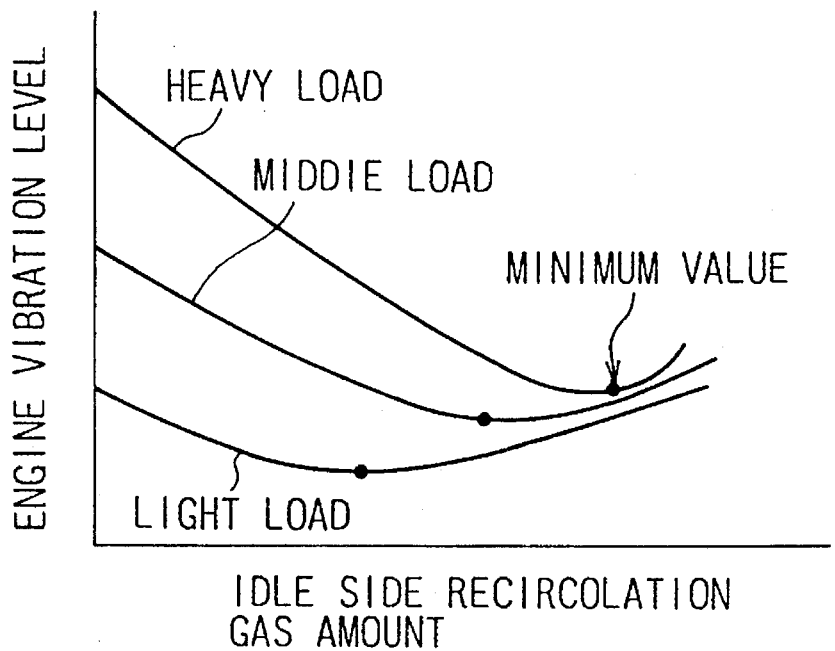
FIG. 3 is a view of the vibration level of an engine.

The higher the load of the operating cylinder group, the higher the positive torque peak A caused by the explosions at the operating cylinder group, so the higher the load of the operating cylinder group, the more it is necessary to increase the amount of recirculated gas to the idle cylinder group and increase the negative torque peak C of before the top dead center of compression of the idle cylinder group. That is, as shown in FIG. 3, there is an amount of recirculated gas giving the minimum level of engine vibration according to the load of the operating cylinder group. As will be understood from FIG. 3, the amount of recirculated gas giving the minimum level of engine vibration increases the higher the load of the operating cylinder group. In the embodiment according to the present invention, the amount of the recirculated gas supplied to the idle cylinder group is determined so as to give this minimum level of engine vibration.

On the other hand, the three-way catalysts in the three-way catalytic converters 12a and 12b have the function of simultaneously reducing the amount of unburnt HC, CO, and NOx. The efficiency of purification of the unburnt HC, CO, and NOx by the three-way catalysts becomes highest when the air-fuel ratios of the air-fuel mixtures supplied to the corresponding cylinder groups are maintained at the stoichiometric air-fuel ratios. That is, a three-way catalyst drops sharply in ability to reduce NOx in a lean atmosphere with an excess of air. Accordingly, the action of the three-way catalyst in reducing NOx is disabled in a lean atmosphere.

However, during partial cylinder operation, the gas exhausted from the idle cylinder group into the corresponding exhaust manifolds 11a and 11b is mostly air. The majority of the air is recirculated to the idle cylinder group as recirculated gas, while the remaining air is fed through the three-way catalytic converters 12a and 12b of the idle cylinder group and the corresponding exhaust pipes 13a and 13b to the common exhaust pipe 14. As shown in FIG. 1, however, the exhaust pipes 13a and 13b converge with each other at the outlet portions and therefore the air flowing out into the exhaust pipes 13a and 13b of the idle cylinder group passes through the converging portion of the exhaust pipes 13a and 13b and scatters toward the three-way catalysts of the idle cylinder group. Accordingly, if the distance between the three-way catalysts of the operating cylinder group and the converging portion of the exhaust pipes 13a and 13b is short, the scattered air will cause the three-way catalysts of the operating cylinder group to be placed in a lean atmosphere and therefore become unable to purify the NOx well.

Figure 4:
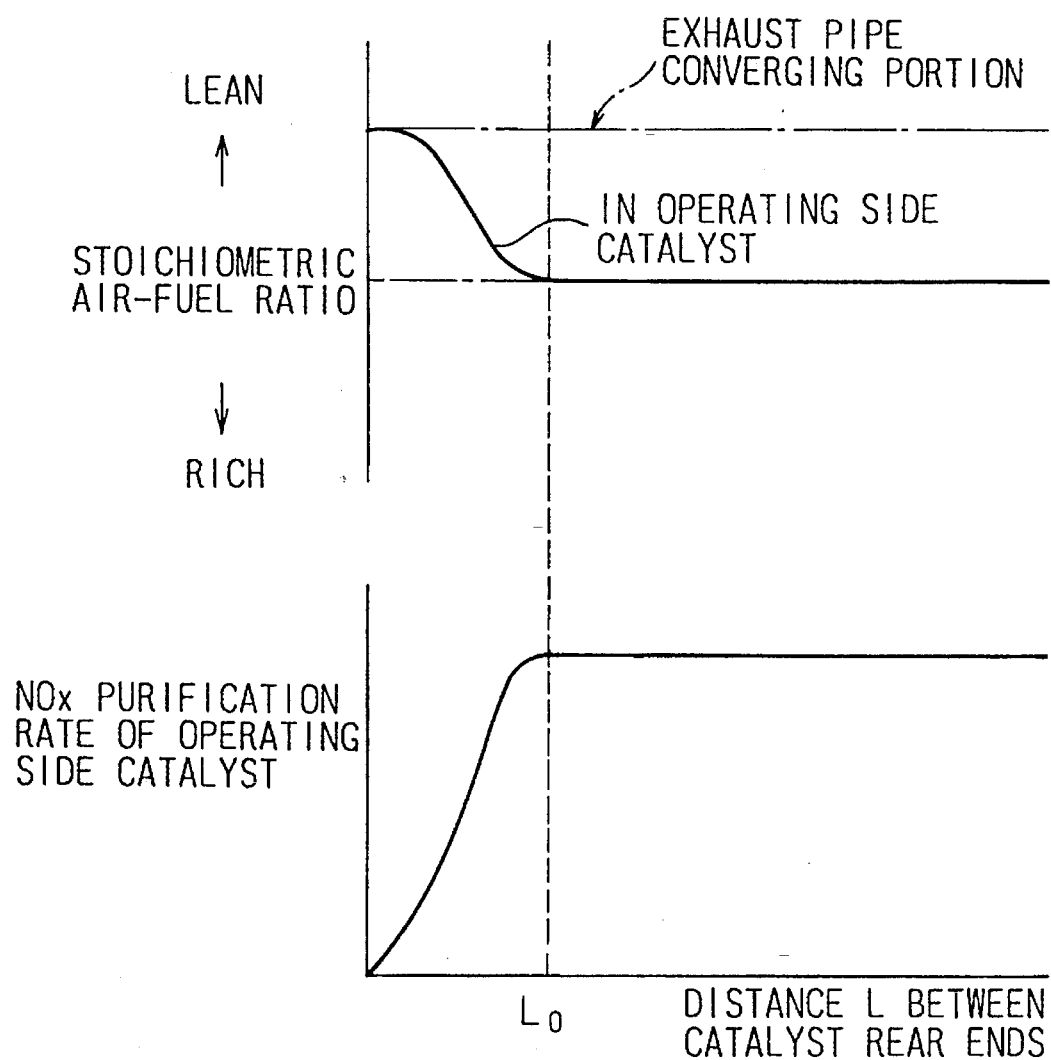
FIG. 4 is a diagram of the rate of purification of NOx.

FIG. 4 shows the distance L between the rear ends of the three-way catalysts shown in FIG. 1, the air-fuel ratio of the gas around the three-way catalysts of the operating cylinder group, and the purification rate of NOx by the three-way catalysts of the operating cylinder group. As shown in FIG. 4, when the distance L is less than a certain distance $L_0$, the area around the three-way catalysts of the operating cylinder group becomes lean in atmosphere, so the NOx purification rate falls. To obtain a high NOx purification rate, it is learned that it is necessary to make the distance L at least the distance $L_0$. This $L_0$ differs depending on the type of the engine, but in an engine of a 4-liter or so displacement, this $L_0$ is about 70 cm. Note that when the exhaust pipes 13a and 13b do not converge with each other and the exhaust passages of the cylinder group 1 and the cylinder group 2 are made independent from each other, this problem of a reduction of the NOx purification rate does not occur.

In this embodiment of the present invention, when a predetermined engine operating state is reached, a switch is made from the full cylinder operation to the partial cylinder operation. At this time, however, if the output torque changes, a shock is caused. Accordingly, in this embodiment of the present invention, the output torque is kept from changing when shifting from full cylinder operation to partial cylinder operation or when shifting from partial cylinder operation to full cylinder operation. Further, in this embodiment of the present invention, as mentioned earlier, when the partial cylinder operation continues over a long period, the idle cylinder group is alternated. At this time too, the idle cylinder group is alternated in a manner preventing the output torque from changing.

Figure 5:
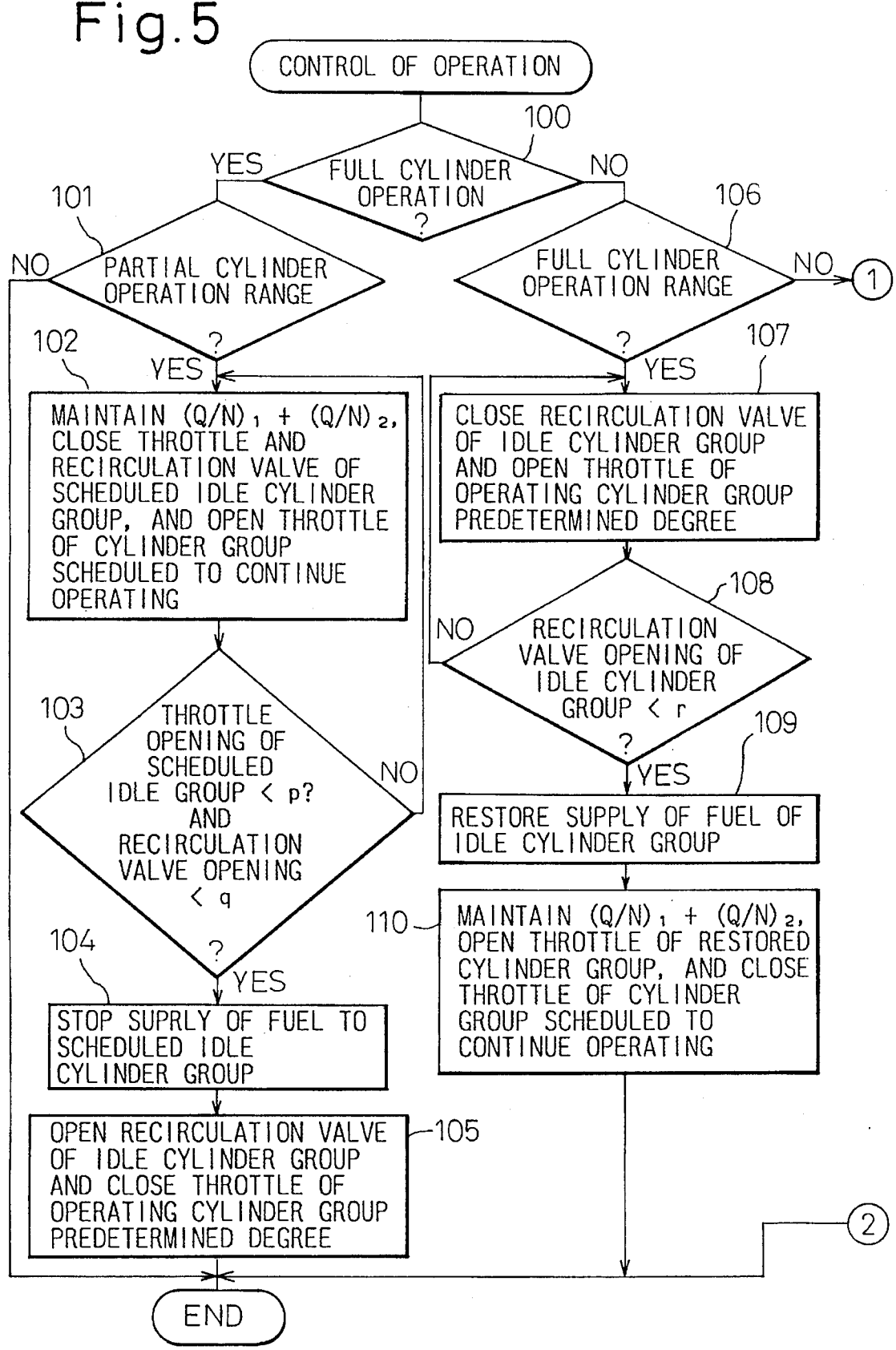
FIG. 5 is a flow chart for the control of the operation of the engine.
Figure 6:
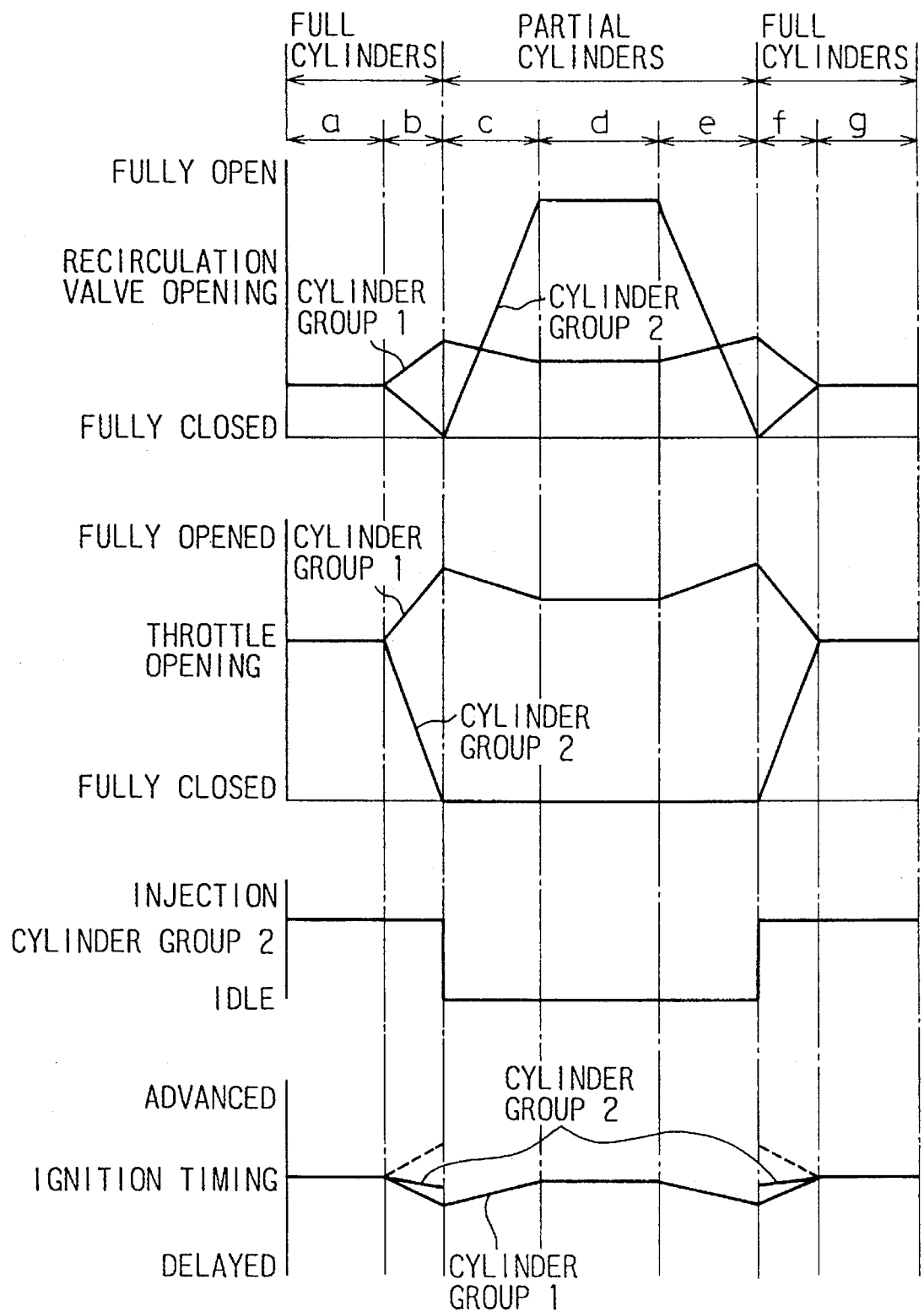
FIG. 6 is a time chart of the changes in the degree of opening of the throttle valve etc.

FIG. 5 and FIG. 6 show the control for the switching between full cylinder operation and partial cylinder operation. Note that FIG. 6 also describes the control of the firing order. The control of the firing order will be explained later.

Figure 7:
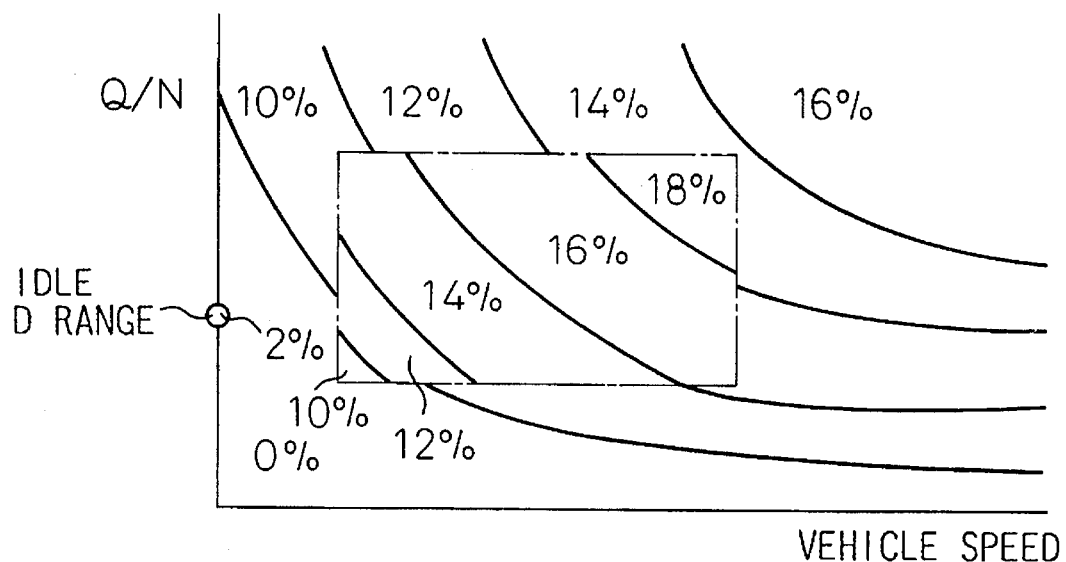
FIG. 7 is a view of the degree of opening of the recirculation valve.
Figure 8:
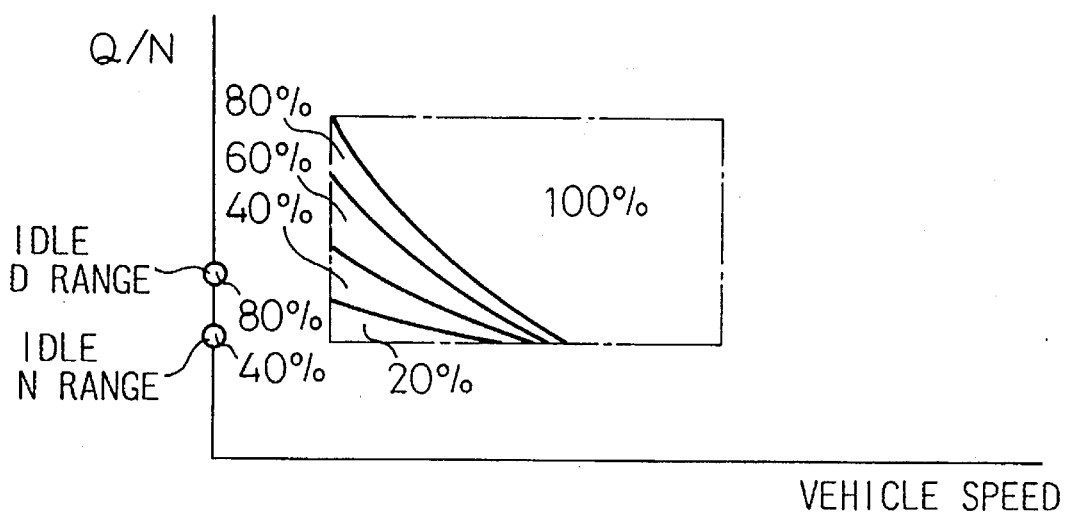
FIG. 8 is a view of the degree of opening of the recirculation valve.

Referring to FIG. 5, first, at step 100, it is judged if the engine is in full cylinder operation or not. When in full cylinder operation, the routine proceeds to step 101, where it is judged if the operating state is one which warrants a partial cylinder operation. The regions enclosed by the broken lines and the regions marked with the circles in FIG. 7 and FIG. 8 are the regions for partial cylinder operation. As will be understood from FIG. 7 and FIG. 8, the partial cylinder operation regions are functions of the engine load Q/N (amount of intake air Q/engine speed N) and the vehicle speed. When it is judged at step 101 that the region is not one of partial cylinder operation, the processing cycle is ended and therefore the full cylinder operation is continued. The full cylinder operation state at this time is shown by the region a in FIG. 6.

That is, at this time, as shown by the region a in FIG. 6, the first throttle valve 10a of the cylinder group 1 and the second throttle valve 10b of the cylinder group 2 are opened by the same degree. Further, the first recirculation valve 16a of the cylinder group 1 and the second recirculation valve 16b of the cylinder group 2 are opened by the same degree. The degrees of opening of the recirculation valves 16a and 16b at the time of full cylinder operation are functions of the engine load Q/N and the vehicle speed, as shown by the area outside that enclosed by the broken line in FIG. 7. Accordingly, at this time, the degrees of opening of the recirculation valves 16a and 16b are made the degrees of opening shown in FIG. 7. Further, needless to say, at this time, fuel is injected from all of the fuel injectors 4a and 4b.

On the other hand, when it is judged at step 101 that the area is one of partial cylinder operation, the sum of the load $(Q/N)_1$ of the cylinder group 1 (amount of intake air Q detected by the first air-flow meter 6a/engine speed N) and the load $(Q/N)_2$ of the cylinder group 2 (amount of intake air Q detected by the second air-flow meter 6b/engine speed N) is maintained at substantially the same load as the total load at the time of full cylinder operation at the region a of FIG. 6, the degrees of opening of the valves of the cylinder group scheduled to continue operating, in the case of FIG. 6, the first throttle valve 10a and the first recirculation valve 16a of the cylinder group 1, are gradually increased as shown by the region b of FIG. 6, and the degrees of opening of the valves of the cylinder group scheduled to be idled, in the case of FIG. 6, the second throttle valve 10b and the second recirculation valve 16b of the cylinder group 2, are gradually reduced.

Note that the output torques of the cylinder groups are proportional to the loads of the cylinder groups and therefore, in the region b of FIG. 6, the sum of the output torque of the cylinder group 1 and the output torque of the cylinder group 2 is maintained at the output torque substantially the same as the output torque of all of the cylinders at the time of full cylinder operation in the region a of FIG. 6. Accordingly, in the region a and the region b of FIG. 6, the output torque of the engine is kept from changing. This is the same in the other regions c, d, e, f, and g in FIG. 6. Therefore, the output torque is kept from changing in all of the regions from the region a to the region g of FIG. 6.

Next, at step 103, it is judged if the load $(Q/N)_2$ of the cylinder group 2 has fallen below a predetermined load, that is, if the degree of opening of the second throttle valve 10b is below a set degree of opening P and the second recirculation valve 16b is below a set degree of opening q. If the degree of opening of the second throttle valve 10b is below the set degree of opening P and the degree of opening of the second recirculation valve 16b is below the set degree of opening q, the routine proceeds to step 104, where the fuel injection from the fuel injectors 4b of the cylinder group 2 is made to stop. Since the supply of fuel to the cylinder group 2 becomes small when the load of the cylinder group 2 becomes small, that is, when the output torque of the cylinder group 2 becomes small, in this way, the fluctuation of the output torque due to the suspension of the supply of fuel is considerably small.

If the supply of fuel to the cylinder group 2 is stopped and the cylinder group 2 is idled, the routine proceeds to step 105, where the second recirculation valve 16b is gradually opened to the degree of opening giving the minimum level of engine vibration as shown by the region c in FIG. 6. The degree of opening giving the minimum level of engine vibration is predetermined as a function of the load Q/N of the operating cylinder group and the vehicle speed as shown by the area inside the block enclosed by the broken line and the circles in FIG. 8 and consequently the second recirculation valve 16b is gradually opened to the degree of opening shown in FIG. 8.

Figure 9:
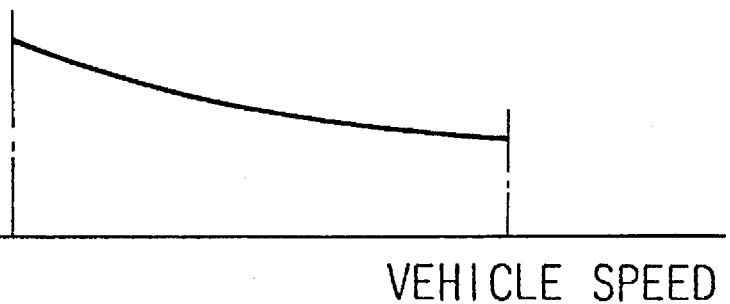
FIG. 9 is a diagram of the amount of correction of the degree of opening of the throttle valve.

On the other hand, if the second recirculation valve 16b is opened, the pumping loss of the cylinder group 2 falls along with it, so to maintain the output torque of the engine constant, the first throttle valve 10a is gradually opened just slightly. The amount of opening of the first throttle valve 10a at this time is predetermined as a function of the vehicle speed, that is, a throttle correction amount, as shown in FIG. 9. On the other hand, if the first throttle valve 10 is gradually closed as mentioned above in the region c of FIG. 6, the first recirculation valve 16a is gradually closed along with it toward the amount of opening in the block enclosed by the broken line in FIG. 7.

When the partial cylinder operation continues for a while and the engine operating state becomes one warranting full cylinder operation as shown by the region d in FIG. 6, the degrees of opening of the throttle valves 10a and 10b and the degrees of opening of the recirculation valves 16a and 16b are made to change by changes in degrees of opening completely opposite to the time of shifting from full cylinder operation to partial cylinder operation.

That is, when partial cylinder operation is started, the routine proceeds from step 100 to step 106, then, when it is judged that the operating state is one warranting full cylinder operation, the routine proceeds to step 107. At step 107, as shown by the region c in FIG. 6, the second recirculation valve 16b is gradually closed and, along with this, the first throttle valve 10a is gradually opened just slightly. Next, at step 108, it is judged if the degree of opening of the second recirculation valve 17b has become smaller than the set degree of opening r. When the degree of opening of the second recirculation valve 16b has become smaller than the set degree of opening r, the routine proceeds to step 109, where the supply of fuel to the cylinder group 2 is started. Accordingly, the engine shifts from partial cylinder operation to full cylinder operation.

When the engine shifts from partial cylinder operation to full cylinder operation, the routine proceeds to step 110, where, as shown by the region f in FIG. 6, the sum of the load $(Q/N)_1$ of the cylinder group 1 and the load $(Q/N)_2$ of the cylinder group 2 is maintained at a load substantially equal to the load of the cylinder group 1 just before the shift to the full cylinder operation, the first throttle valve 10a and the first recirculation valve 16a of the cylinder group 1 are gradually closed, and the second throttle valve 10b and the second recirculation valve 16b of the cylinder group 2 are gradually opened. Next, as shown by the region g of FIG. 6, the degrees of opening of the first throttle valve 10a and the second throttle valve 10b become equal and the degrees of opening of the first recirculation valve 16a and the second recirculation valve 16b become equal.

On the other hand, in FIG. 5, during partial cylinder operation, the routine proceeds from step 100 to step 106, where control is performed to alternate the idle cylinder group when the partial cylinder operation is continued. The method of control for alternating the idle cylinder group may be the first method shown in FIG. 10 and FIG. 11 or the second method shown in FIG. 12 and FIG. 13. First, an explanation will be made of the first method shown in FIG. 10 and FIG. 11.

Figure 10:
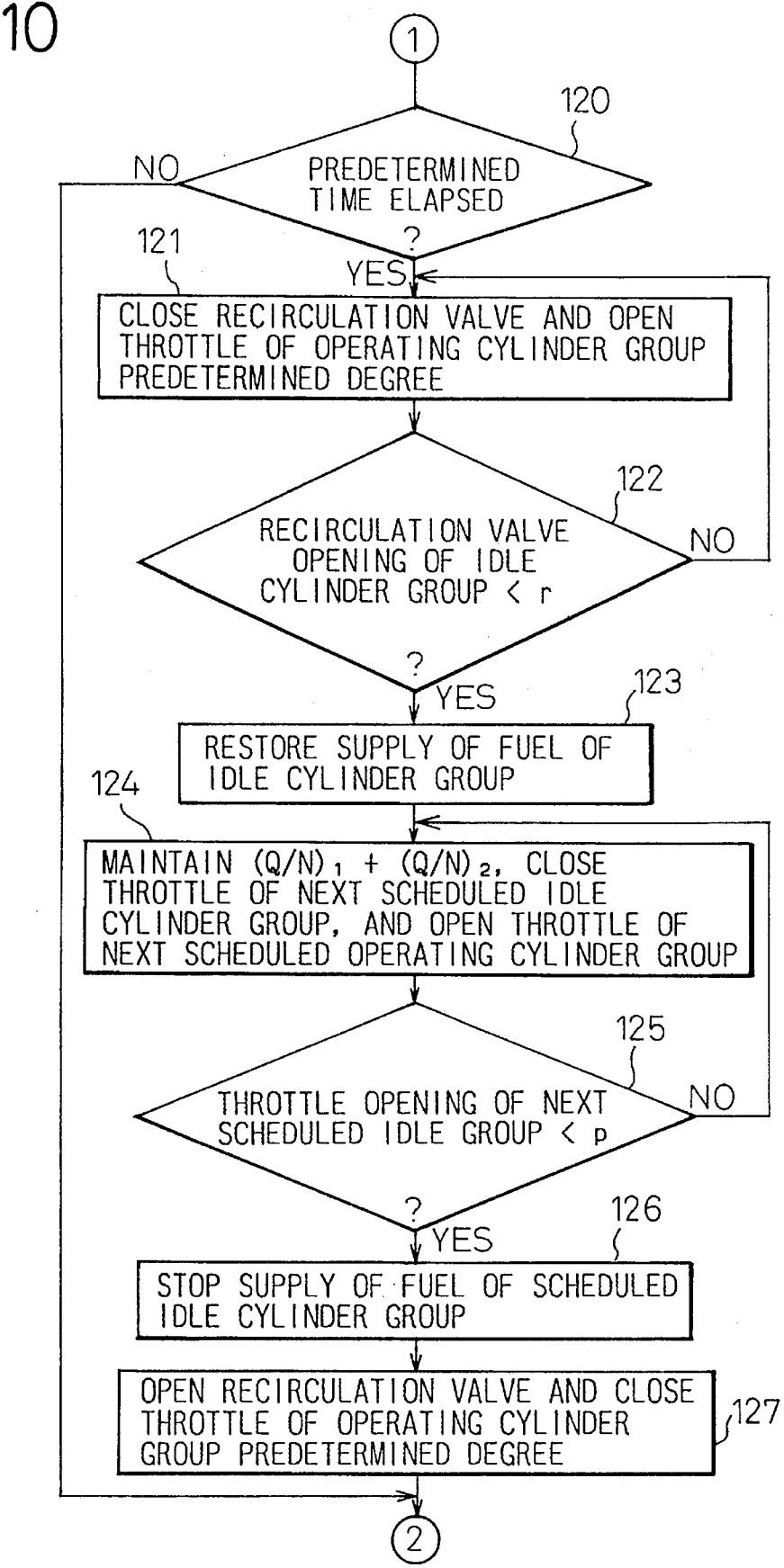
FIG. 10 is a flow chart for the control of the operation of the engine.

In the first method, when it is judged at step 106 of FIG. 5 that the partial cylinder operation is being performed, the routine proceeds to step 120 of FIG. 10, where it is judged if a predetermined time has elapsed from when the partial cylinder operation was started. When the predetermined time has not elapsed, the processing cycle is ended. At this time, the degrees of opening of the throttle valves 10a and 10b and the degrees of opening of the recirculation valves 16a and 16b become the same as the region d of FIG. 6 as shown by the region a in FIG. 11.

Figure 11:
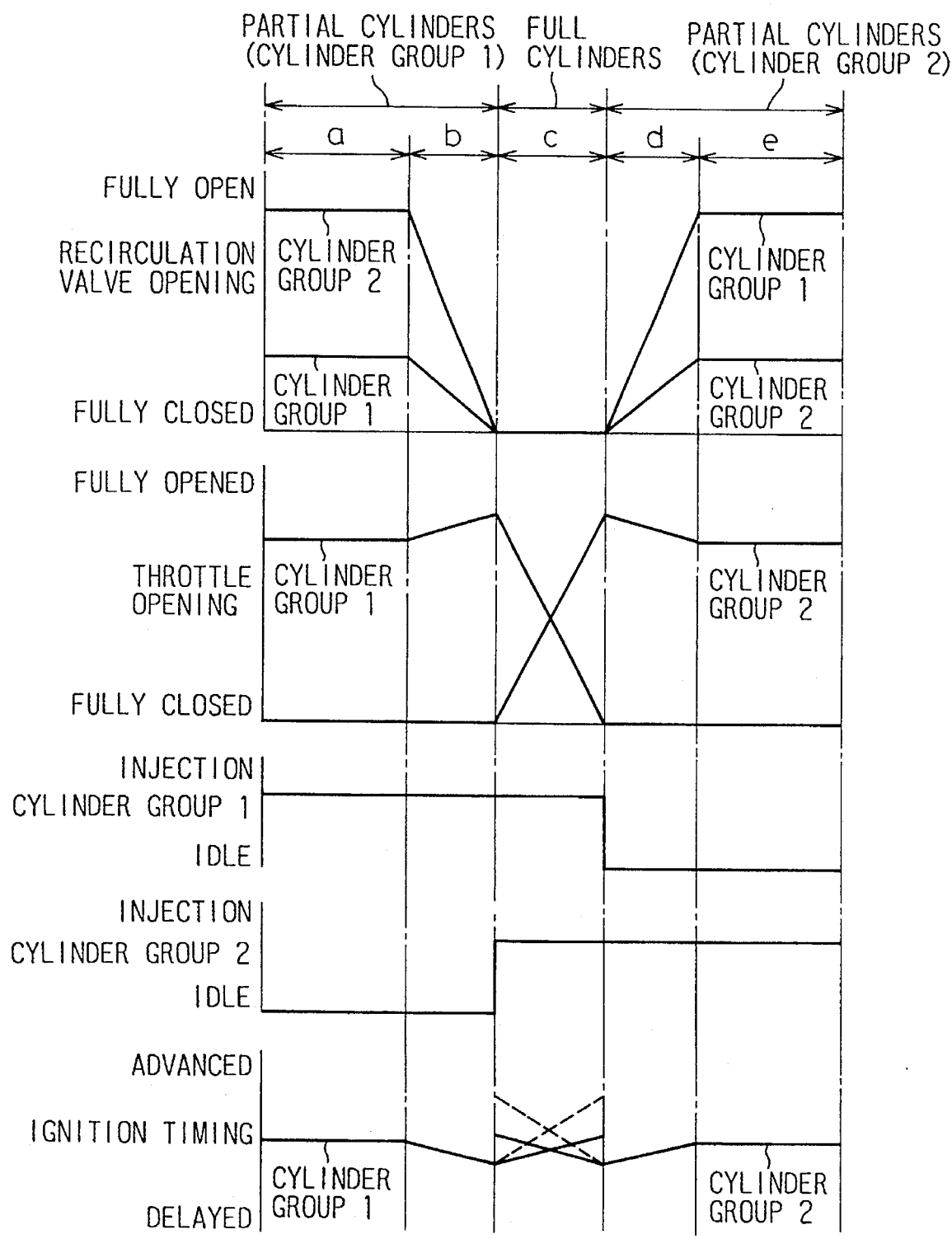
FIG. 11 is a time chart of the changes in the degree of opening of the throttle valve etc.

Next, when it is judged at step 120 that the predetermined time has elapsed, the routine proceeds to step 121, wherein, as shown by the region b in FIG. 11, the second recirculation valve 16b of the cylinder group 2 and the first recirculation valve 16a of the cylinder group 1 are gradually closed. When the second recirculation valve 16b is gradually closed, the pumping loss of the cylinder group 2 gradually becomes larger, so to make the output torque constant, the first throttle valve 10a of the cylinder group 1 is made to gradually open just slightly.

Next, at step 122, it is judged if the degree of opening of the second recirculation valve 16b of the cylinder group 2 has become less than the set degree of opening r. When the degree of opening of the second recirculation valve 16b has become less than the set degree of opening r, the routine proceeds to step 123, where the fuel injection from the fuel injectors 4b of the cylinder group 2 is started. As a result, the engine shifts from partial cylinder operation to full cylinder operation. When shifting to full cylinder operation, the routine proceeds to step 124, where, as shown by the region c of FIG. 11, the sum of the load $(Q/N)_1$ of the cylinder group 1 and the load $(Q/N)_2$ of the cylinder group 2 is maintained at substantially the same load as the load of the cylinder group 1 just before the start of the full cylinder operation, the first throttle valve 10a of the cylinder group 1 is gradually closed, and the second throttle valve 10b of the cylinder group 2 is gradually opened. Note that during the full cylinder operation, the two recirculation valves 16a and 16b are held in the closed state.

Next, at step 125, it is judged if the degree of opening of the first throttle valve 10a of the cylinder group 1 has become less than the set degree of opening P. When the degree of opening of the first throttle valve 10a has become less than the set degree of opening P, the routine proceeds to step 126, wherein the fuel injection from the fuel injectors 4a of the cylinder group 1 is stopped and therefore the cylinder group 1 is made idle. Next, at step 127, the first recirculation valve 16a is gradually opened until the degree of opening shown in FIG. 8, while the second recirculation valve 16b is gradually opened to the degree of opening shown in FIG. 7. During this time the second throttle valve 10b is gradually closed just slightly. Next, at the region e of FIG. 11, the partial cylinder operation by the cylinder group 2 is continued.

Figure 12:
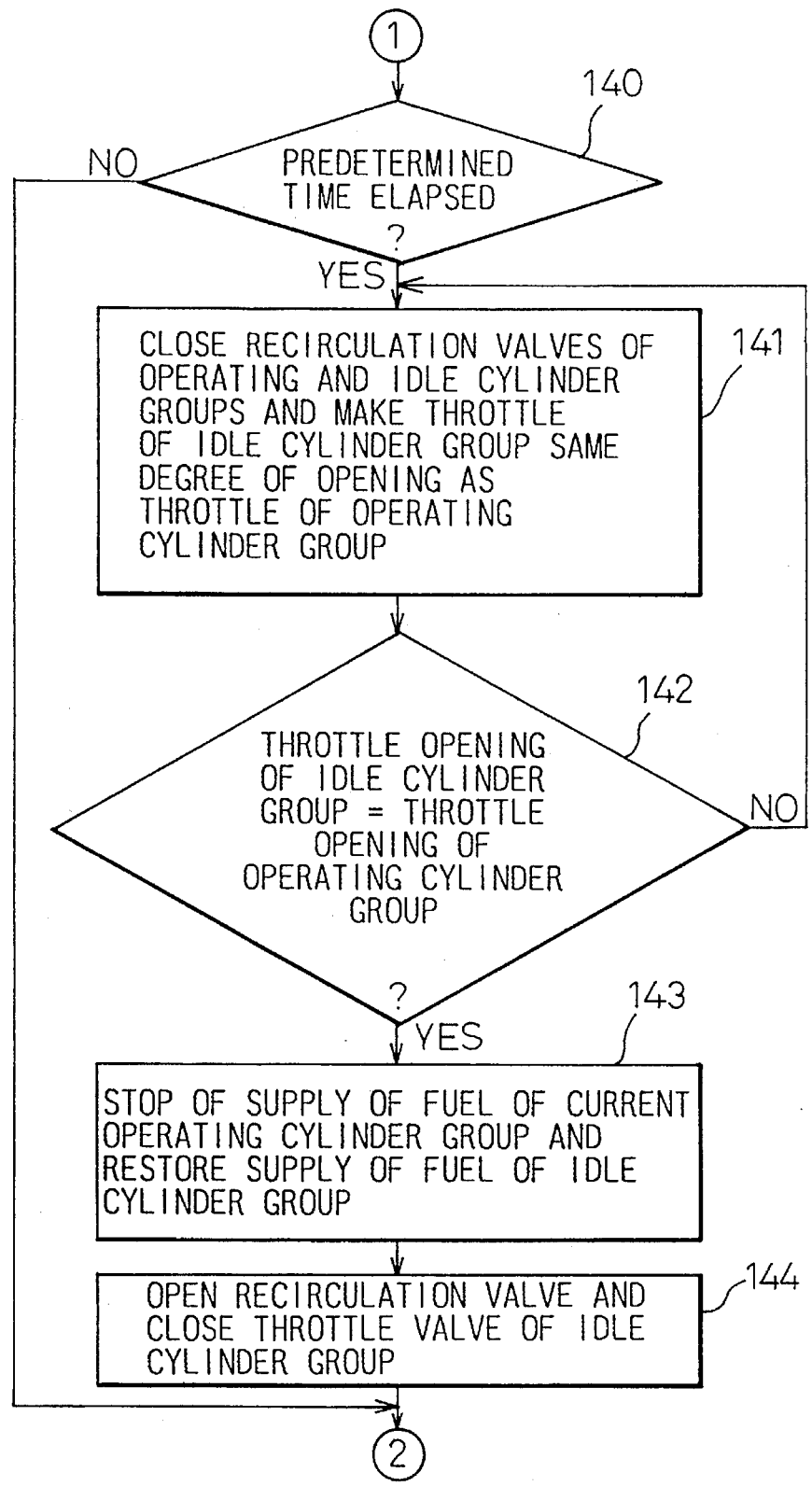
FIG. 12 is a flow chart for the control of the operation of the engine.

Next, an explanation will be made of the second method shown in FIG. 12 and FIG. 13. In this second method, when it is judged at step 106 of FIG. 5 that the partial cylinder operation is being performed, the routine proceeds to step 140 of FIG. 12, where it is judged if a predetermined time has elapsed from the start of the partial cylinder operation. When the predetermined time has not elapsed, the processing cycle is ended. At this time, the degrees of opening of the throttle valves 10a and 10b and the degrees of opening of the recirculation valves 16a and 16b become the same degrees of opening as the region d of FIG. 6 as shown in the region a of FIG. 13.

Figure 13:
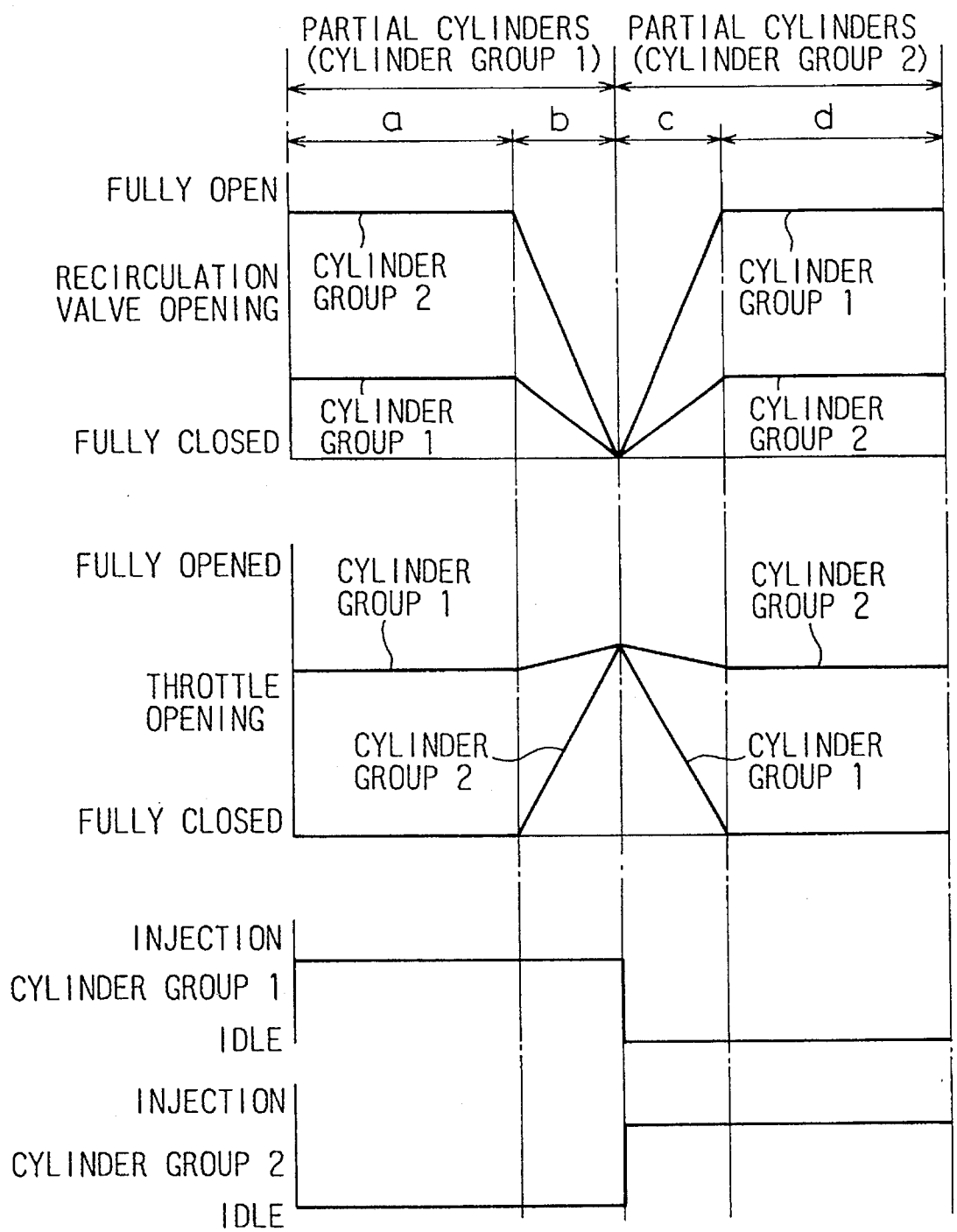
FIG. 13 is a time chart of the changes in the degree of opening of the throttle valve etc.

Next, when it is judged at step 140 that the predetermined time has elapsed, the routine proceeds to step 141, where, as shown by the region b of FIG. 13, the output torque of the engine is maintained constant, the first recirculation valve 16a and the second recirculation valve 16b are gradually closed, the first throttle valve 10a of the cylinder group 1 is gradually opened just slightly, and the second throttle valve 10b of the cylinder group 2 is gradually opened to a degree of opening the same as the first throttle valve 10a.

Next, at step 142, it is judged if the degree of opening of the first throttle valve 10a and the degree of opening of the second throttle valve 10b have become equal. When the degree of opening of the first throttle valve 10a and the degree of opening of the second throttle valve 10b have become equal, the routine proceeds to step 143, where the fuel injection to the cylinder group 1 is stopped and the fuel injection to the cylinder group 2 is started. Therefore, at this time, the engine shifts from partial cylinder operation by the cylinder group 1 to partial cylinder operation by the cylinder group 2.

Next, at step 144, as shown by the region c of FIG. 13, the first recirculation valve 16a is gradually opened to the degree of opening shown in FIG. 8, while the second recirculation valve 16b is gradually opened to the degree of opening shown in FIG. 7. Further, the first throttle valve 10a is gradually closed to substantially the fully closed position, while the second throttle valve 10b is gradually closed just slightly. Next, in the region d of FIG. 13, the partial cylinder operation by the cylinder group 2 is continued.

Next, an explanation will be made of the control of the firing order when switching between full cylinder operation and partial cylinder operation or when alternating the cylinder group for the partial cylinder operation. First, in FIG. 6, when considering the shifting of the engine from the full cylinder operation to the partial cylinder operation, the fuel injection to the cylinder group 2 is stopped when the load of the cylinder group 2 becomes smaller than a predetermined load so as to prevent as much as possible fluctuations in the output torque caused by the suspension of the fuel injection. In this case, it is preferable to delay the ignition timing as much as possible when the fuel injection is stopped so as to suppression fluctuations in the output torque. Therefore, in the embodiment shown in FIG. 6, the ignition timing of the cylinder group 2, which originally is advanced as shown by the broken line in the region b of FIG. 6, is delayed as shown by the solid line. Of course, if the ignition timing is delayed in this way, the output torque of the cylinder group 2 falls, so to compensate for the fall of the output torque of the cylinder group 2, the degree of opening of the first throttle valve 10a of the cylinder group 1 is increased from the degree of opening shown in FIG. 6.

Further, even in the case of shifting from partial cylinder operation to full cylinder operation, when starting fuel injection to the cylinder group which had been idle up to then, delaying the ignition timing of that cylinder group reduces the fluctuation of the output torque. Accordingly, even in the region f of FIG. 6, the ignition timing of the cylinder group 2 is delayed from the normal ignition timing shown by the broken line. In this case, to compensate for the fall of the output torque of the cylinder group 2 caused by the delay of the ignition timing, the degree of opening of the first throttle valve 10a is increased from the degree of opening shown in FIG. 6.

As shown in FIG. 11, even when alternating the idle cylinder group, it is preferable to delay the ignition timing at the time of starting the fuel injection and at the time of stopping the fuel injection so as to suppress fluctuations in the output torque at the time of starting the fuel injection or the time of stopping the fuel injection. Accordingly, when alternating the idle cylinder group, as shown by the region c of FIG. 11, the ignition timing of the cylinder group 1 and the ignition timing of the cylinder group 2 are delayed from the normal ignition timings shown by the broken lines. In this case too, the falls in the output torques of the cylinder groups due to the delay of the ignition timings are compensated for by increasing the degree of opening of the first throttle valve 10a and the degree of opening of the second throttle valve 10b from the degrees of opening shown in FIG. 11.

Figure 14:
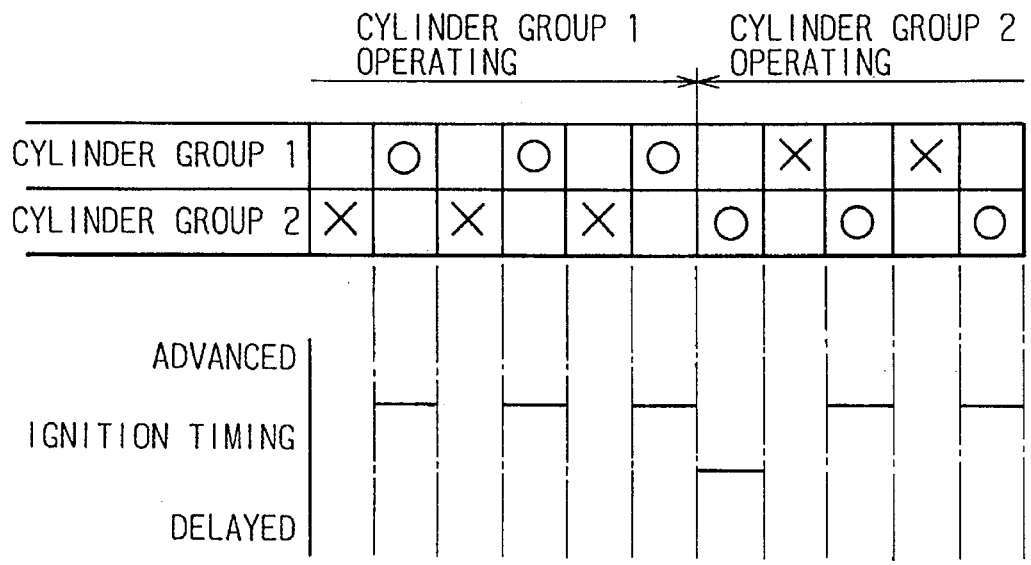
FIG. 14 is a view explaining the control of the firing timing.

On the other hand, even when alternating the idle cylinder group, in the case shown in FIG. 13, the idle cylinder group is alternated in the state with large degrees of opening of the throttle valves 10a and 10b. In such a state, as shown in FIG. 14, it is preferable to delay the ignition timing for just the one ignition just after the operating cylinder group has been alternated, that is, just the first ignition of the cylinder group 2 in the case of switching the operating cylinder group from the cylinder group 1 to the cylinder group 2. Note that the circle marks in FIG. 14 show the cylinder group where the ignition is performed at all cylinders, while the x marks show the cylinder group where the ignition is not performed at any cylinders.

Figure 15:
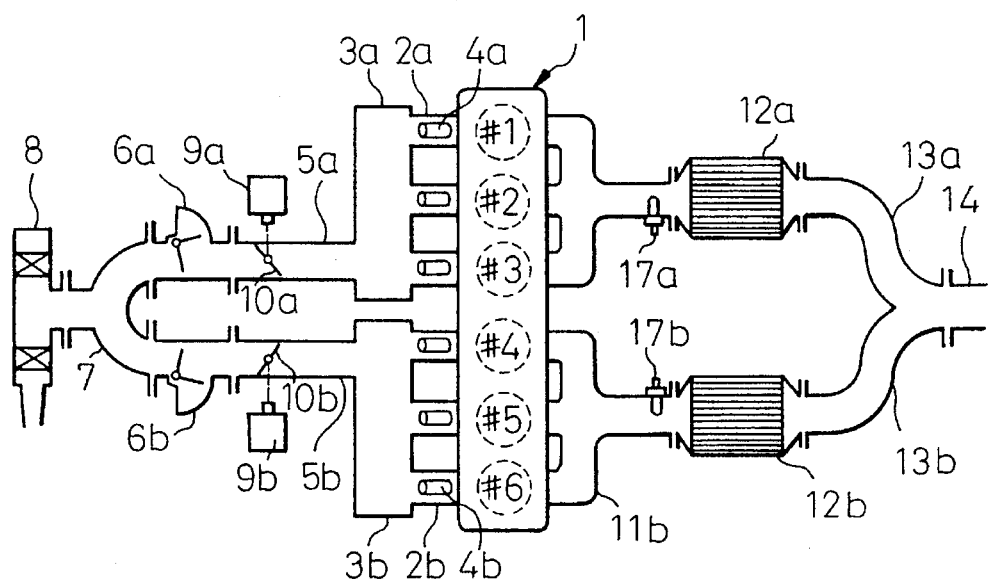
FIG. 15 is an overview of another embodiment of the internal combustion engine.

FIG. 15 shows another embodiment of the engine. This engine differs from the engine shown in FIG. 1 in that it is not provided with the recirculated gas passage connecting the exhaust manifolds 11a and 11b and the corresponding intake ducts 5a and 5b. Therefore, in this engine, by controlling the degrees of opening of the throttle valves 10a and 10b, the fluctuations in the output torque can be inhibited at the time of switching between full cylinder operation and partial cylinder operation and at the time of alternating the idle cylinder group in the case where the partial cylinder operation continues.

Figure 16:
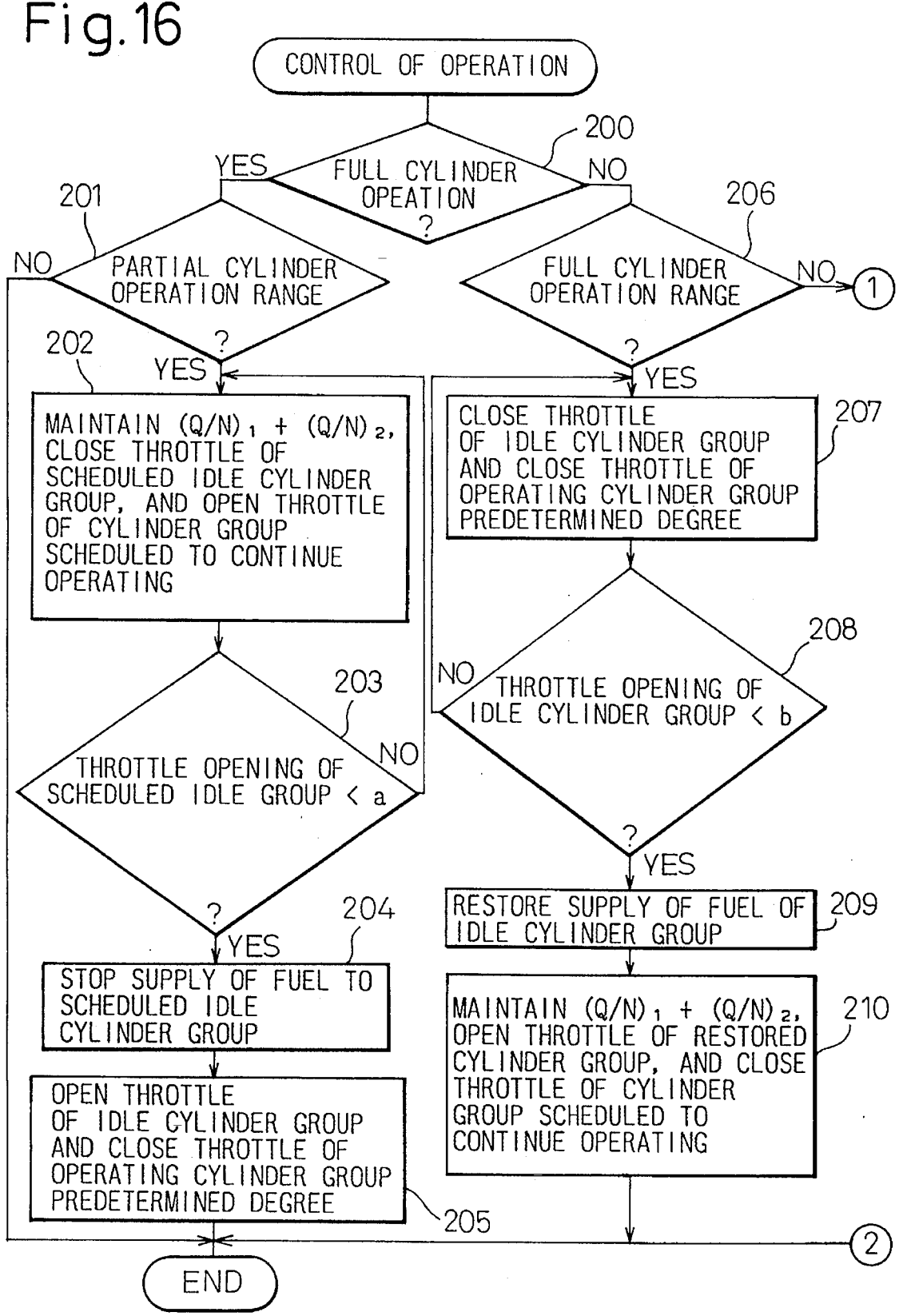
FIG. 16 is a flow chart for the control of the operation of the engine.
Figure 17:
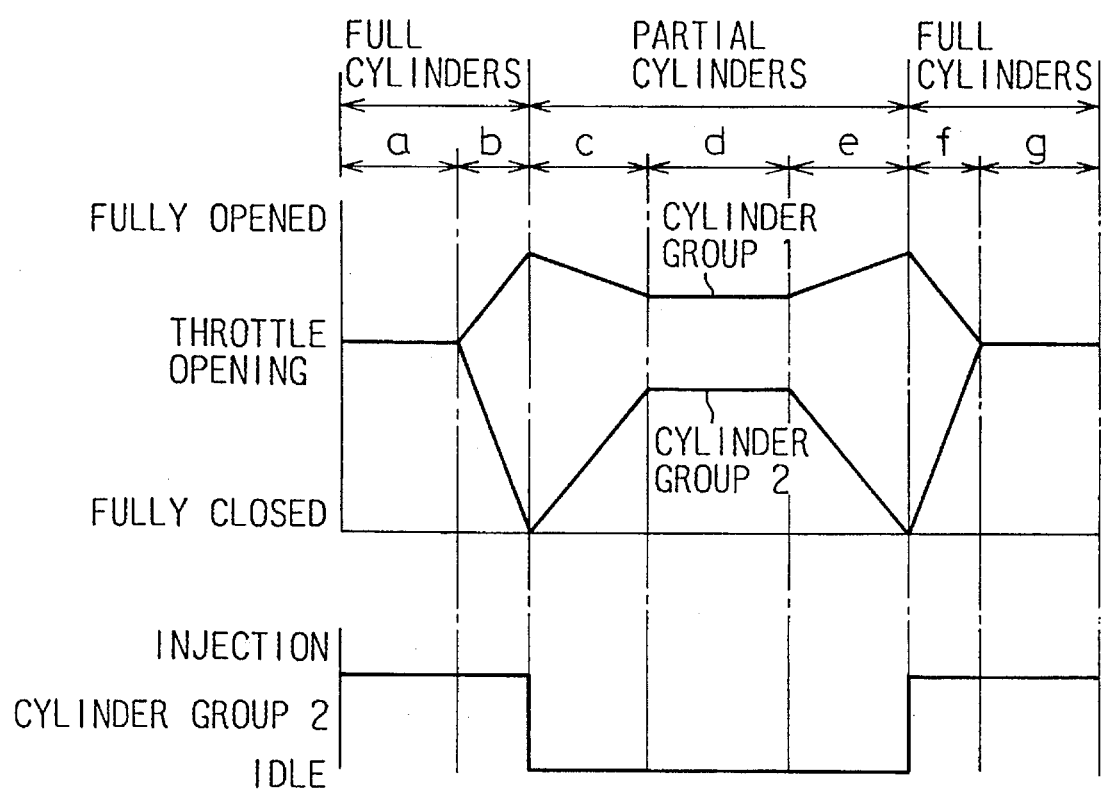
FIG. 17 is a time chart of the changes in the degree of opening of the throttle valve etc.

FIG. 16 and FIG. 17 show the control for switching between the full cylinder operation and the partial cylinder operation. Referring to FIG. 16, first, at step 200, it is judged if the full cylinder operation is under way. If the full cylinder operation is under way, the routine proceeds to step 201, where it is judged if the operating state warrants a partial cylinder operation. In this embodiment as well, the regions enclosed by the broken lines and the regions of the circle marks in FIG. 7 and FIG. 8 are the regions of partial cylinder operation. Consequently, the regions of partial cylinder operation are functions of the engine load Q/N (amount of intake air Q/engine speed N) and the vehicle speed. When it is judged at step 201 that the region is not one of a partial cylinder operation, the processing cycle is ended and therefore the full cylinder operation is continued. The state of the full cylinder operation at this time is shown by the region a in FIG. 17.

That is, at this time, as shown by the region a in FIG. 16, the first throttle valve 10a of the cylinder group 1 and the second throttle valve 10b of the cylinder group 2 become the same in degrees of opening. Of course, at this time, fuel is being injected from all of the fuel injectors 4a and 4b.

On the other hand, when it is judged at step 201 that the region is one of a partial cylinder operation, the sum of the load $(Q/N)_1$ of the cylinder group 1 and the load $(Q/N)_2$ of the cylinder group 2 is maintained at a load substantially the same as the total load of the time of full cylinder operation in the region a of FIG. 17, and, as shown by the region b of FIG. 6, the degree of opening of the valve of the cylinder group scheduled to continue operating, in the case of FIG. 17, the first throttle valve 10a of the cylinder group 1, is gradually increased, while the degree of opening of the valve of the cylinder group scheduled to be idled, in the case of FIG. 17, the second throttle valve 10b of the cylinder group 2, is gradually reduced.

Note that, as explained above, the output torques of the cylinder groups are proportional to the loads of the cylinder groups and, therefore, in the region b of FIG. 17, the sum of the output torque of the cylinder group 1 and the output torque of the cylinder group 2 is maintained at an output torque substantially the same as the output torque of all of the cylinders at the time of the full cylinder operation in the region a of FIG. 17. Therefore, in the region a and the region b of FIG. 17, the output torque of the engine does not change. The same applies in the other regions c, d, e, f, and g of FIG. 17. Accordingly, the output torque does not change in all of the regions from the region a to the region g of FIG. 17.

Next, at step 203, it is judged if the load $(Q/N)_2$ of the cylinder group has become lower than a predetermined load, that is, if the degree of opening of the second throttle valve 10b has become less than the set degree of opening a. If the degree of opening of the second throttle valve 10b has become less than the set degree of opening a, the routine proceeds to step 204, where the fuel injection from the fuel injectors 4b of the cylinder group 2 is stopped. Since the supply of fuel to the cylinder group 2 is stopped when the load of the cylinder group 2 becomes smaller in this way, that is, when the output torque of the cylinder group 2 becomes smaller, the fluctuation of the output torque due to the suspension of the supply of fuel becomes considerably small.

Figure 18A:
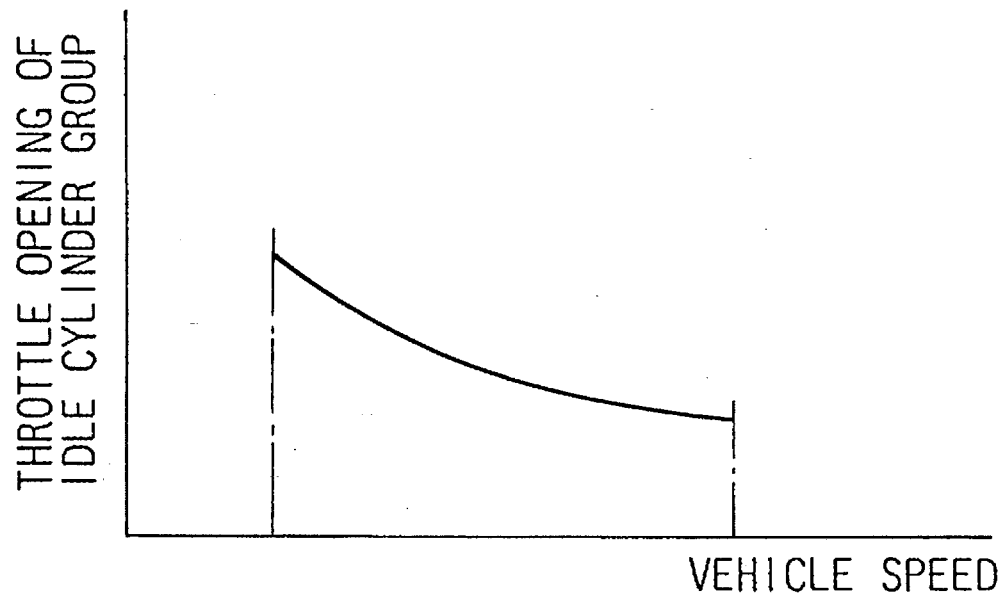
FIGS. 18A and 18B are diagrams of the degree of opening of the throttle valve etc.

If the supply of fuel to the cylinder group 2 is stopped and the cylinder group is idled, the routine proceeds to step 205, where the second throttle valve 10b is gradually opened until the degree of opening giving close to the minimum level of engine vibration as shown by the region c in FIG. 17. The degree of opening giving close the minimum level of engine vibration is predetermined as a function of the vehicle speed as shown in FIG. 18A. Therefore, the second throttle valve 10b is gradually opened until the degree of opening shown in FIG. 18A.

Figure 18B:
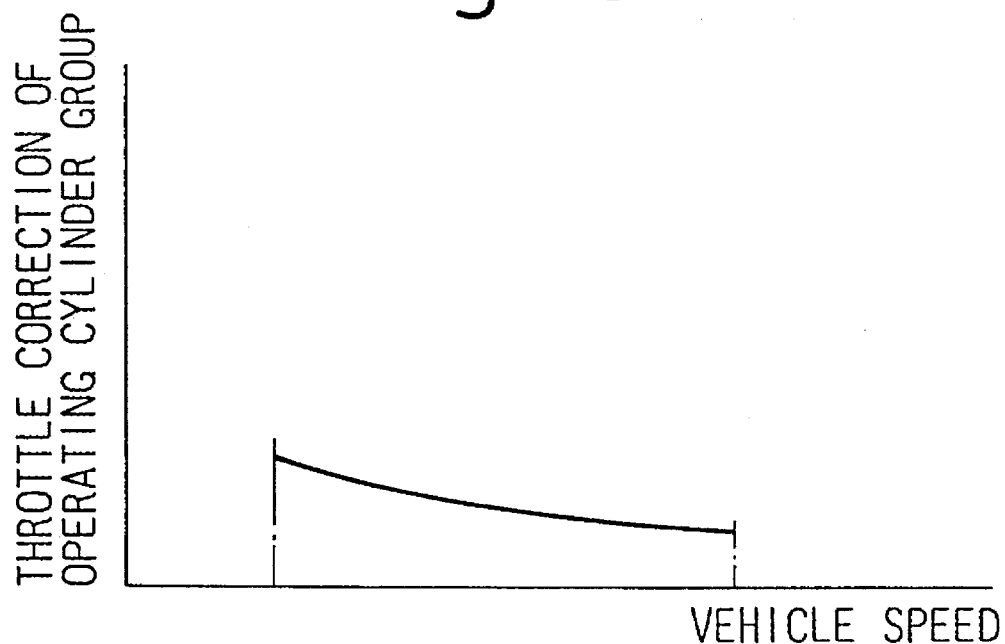

On the other hand, when the second throttle valve 10b is opened, the pumping loss of the cylinder group 2 falls correspondingly, so to maintain the output torque of the engine constant, the first throttle valve 10a is gradually closed just slightly. The amount of closing of the first throttle valve 10a at this time is predetermined as a function of the vehicle speed, that is, an amount of throttle correction, as shown in FIG. 18B.

As shown by the region d of FIG. 17, when the partial cylinder operation continues for a while and then the operating state becomes one warranting full cylinder operation, the degrees of opening of the throttle valves 10a and 10b are changed by the changes of degrees of opening completely opposite to the time of shifting from the full cylinder operation to the partial cylinder operation.

That is, when partial cylinder operation is started, the routine proceeds from the step 200 to the step 206. When it is judged that the operating region is one warranting full cylinder operation, the routine proceeds to step 207. At step 207, as shown by the region e in FIG. 17, the second throttle valve 10b is gradually closed. Along with this, the first throttle valve 10a is gradually opened just slightly. Next, at step 208, it is judged if the degree of opening of the second throttle valve 10b has become smaller than the set degree of opening b. When the degree of opening of the second throttle valve 10b has become smaller than the set degree of opening b, the routine proceeds to step 209, where the supply of fuel to the cylinder group 2 is started. Therefore, the engine shifts from the partial cylinder operation to the full cylinder operation.

When shifting from the partial cylinder operation to the full cylinder operation, the routine proceeds to step 210, where, as shown by the region f of FIG. 17, the sum of the load $(Q/N)_1$ of the cylinder group 1 and the load $(Q/N)_2$ of the cylinder group 2 is maintained at a load substantially the same as the load of the cylinder group 1 just before the shifting to the full cylinder operation, the first throttle valve 10a of the cylinder group 1 is gradually closed, and the second throttle valve 10b of the cylinder group 2 is gradually opened. Next, as shown by the region g of FIG. 17, the degrees of opening of the first throttle valve 10a and the second throttle valve 10b become equal.

On the other hand, in FIG. 16, during partial cylinder operation, the routine proceeds from step 200 to step 206, where, when the partial cylinder operation continues, control is performed to alternate the idle cylinder group. The method of control for alternating the idle cylinder group may be the first method shown in FIG. 19 and FIG. 20 or the second method shown in FIG. 21 and FIG. 22. First, an explanation will be made of the first method shown in FIG. 19 and FIG. 20.

Figure 19:
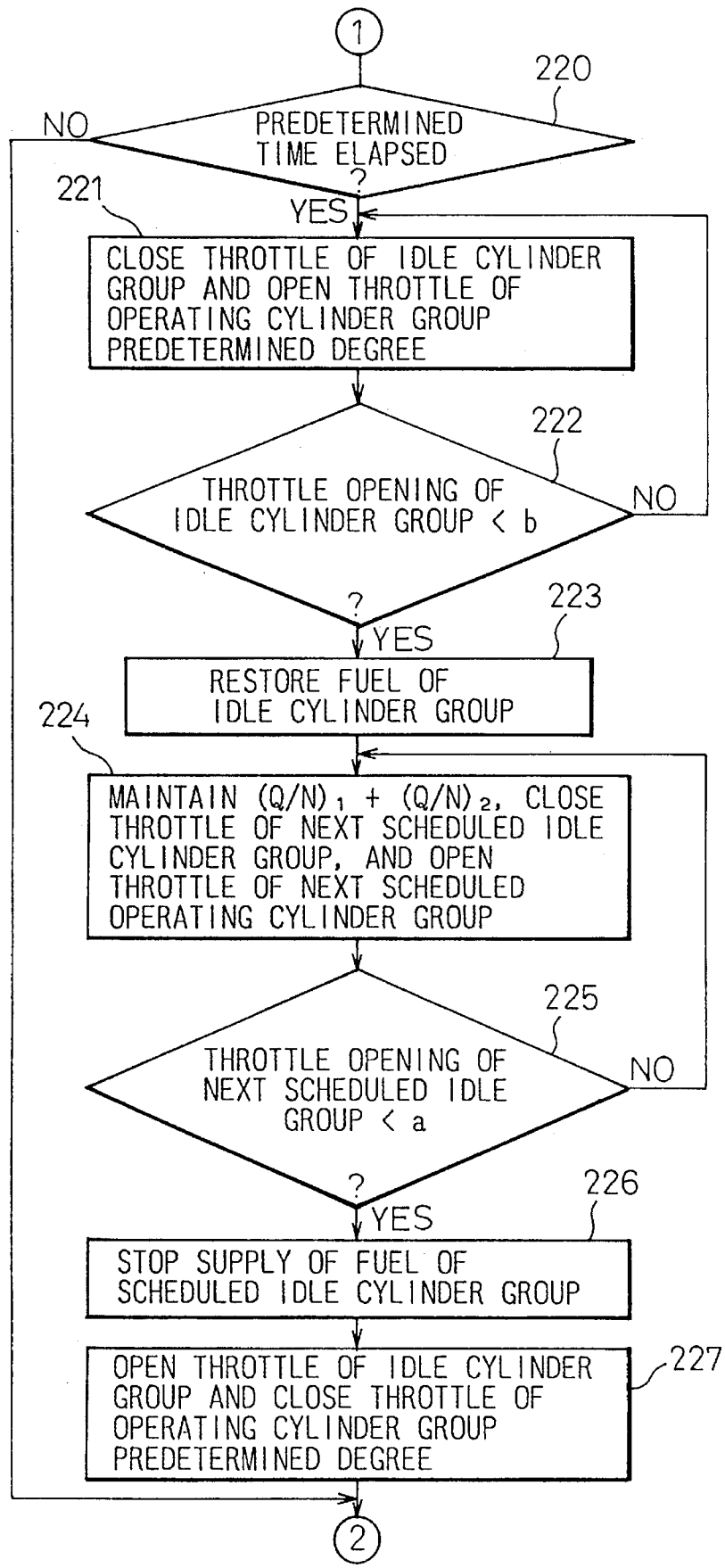
FIG. 19 is a flow chart for the control of the operation of the engine.

In the first method, when it is judged at step 206 of FIG. 16 that the partial cylinder operation is being performed, the routine proceeds to step 220 of FIG. 19, where it is judged if a predetermined time has elapsed from the start of the partial cylinder operation. When the predetermined time has not elapsed, the processing cycle is ended. At this time, the degrees of opening of the throttle valves 10a and 10b become the same as the region d of FIG. 17 as shown by the region a of FIG. 20.

Figure 20:
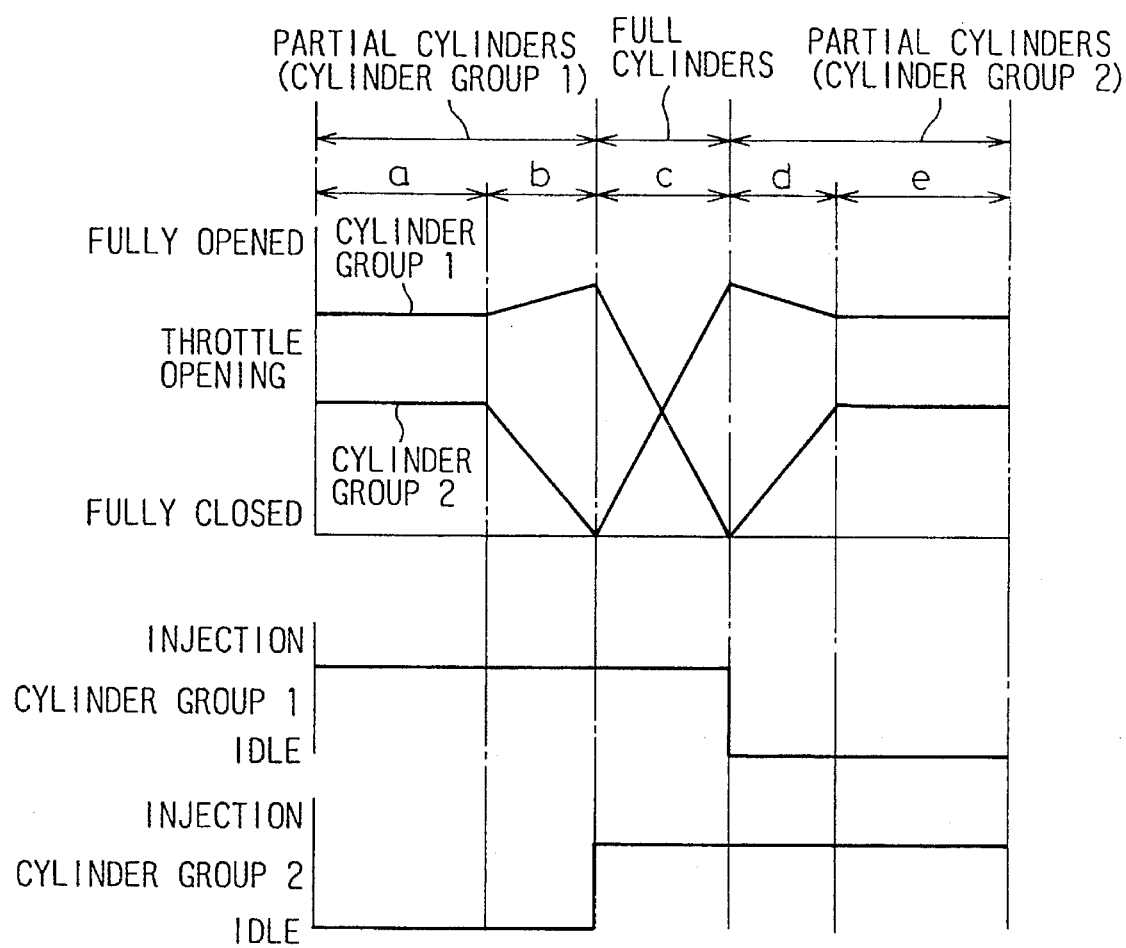
FIG. 20 is a time chart of the changes in the degree of opening of the throttle valve etc.

Next, when it is judged at step 220 that the predetermined time has elapsed, the routine proceeds to step 221, where the second throttle valve 10b of the cylinder group 2 is gradually closed, as shown by the region b of FIG. 20. When the second throttle valve 10b is gradually closed, the pumping loss of the cylinder group 2 gradually becomes larger, so to make the output torque constant, the first throttle valve 10a of the cylinder group 1 is gradually opened just slightly.

Next, at step 222, it is judged if the degree of opening of the second throttle valve 10b of the cylinder group 2 has become less than a set degree of opening b. When the degree of opening of the second throttle valve 10b has become less than the set degree of opening b, the routine proceeds to step 223, where the fuel injection from the fuel injectors 4b of the cylinder group 2 is started. As a result, the engine shifts from partial cylinder operation to full cylinder operation. When shifting to full cylinder operation, the routine proceeds to step 224, where, as shown by the region c of FIG. 20, the sum of the load $(Q/N)_1$ of the cylinder group 1 and the load $(Q/N)_2$ of the cylinder group 2 is maintained at a load substantially the same as the load of the cylinder group 1 just before the start of the full cylinder operation, the first throttle valve 10a of the cylinder group 1 is gradually closed, and the second throttle valve 10b of the cylinder group 2 is gradually opened.

Next, at step 225, it is judged if the degree of opening of the first throttle valve 10a of the cylinder group 1 has become less than a set degree of opening a. When the degree of opening of the first throttle valve 10a has become less than the set degree of opening a, the routine proceeds to step 226, where the fuel injection from the fuel injectors 4a of the cylinder group 1 is stopped and, therefore, the cylinder group 1 is made to idle. Next, at step 227, the first throttle valve 10 is gradually opened until the degree of opening shown in FIG. 18A. During this time, the second throttle valve 10b is gradually closed just slightly. Next, in the region e of FIG. 20, the partial cylinder operation by the cylinder group 2 is continued.

Figure 21:
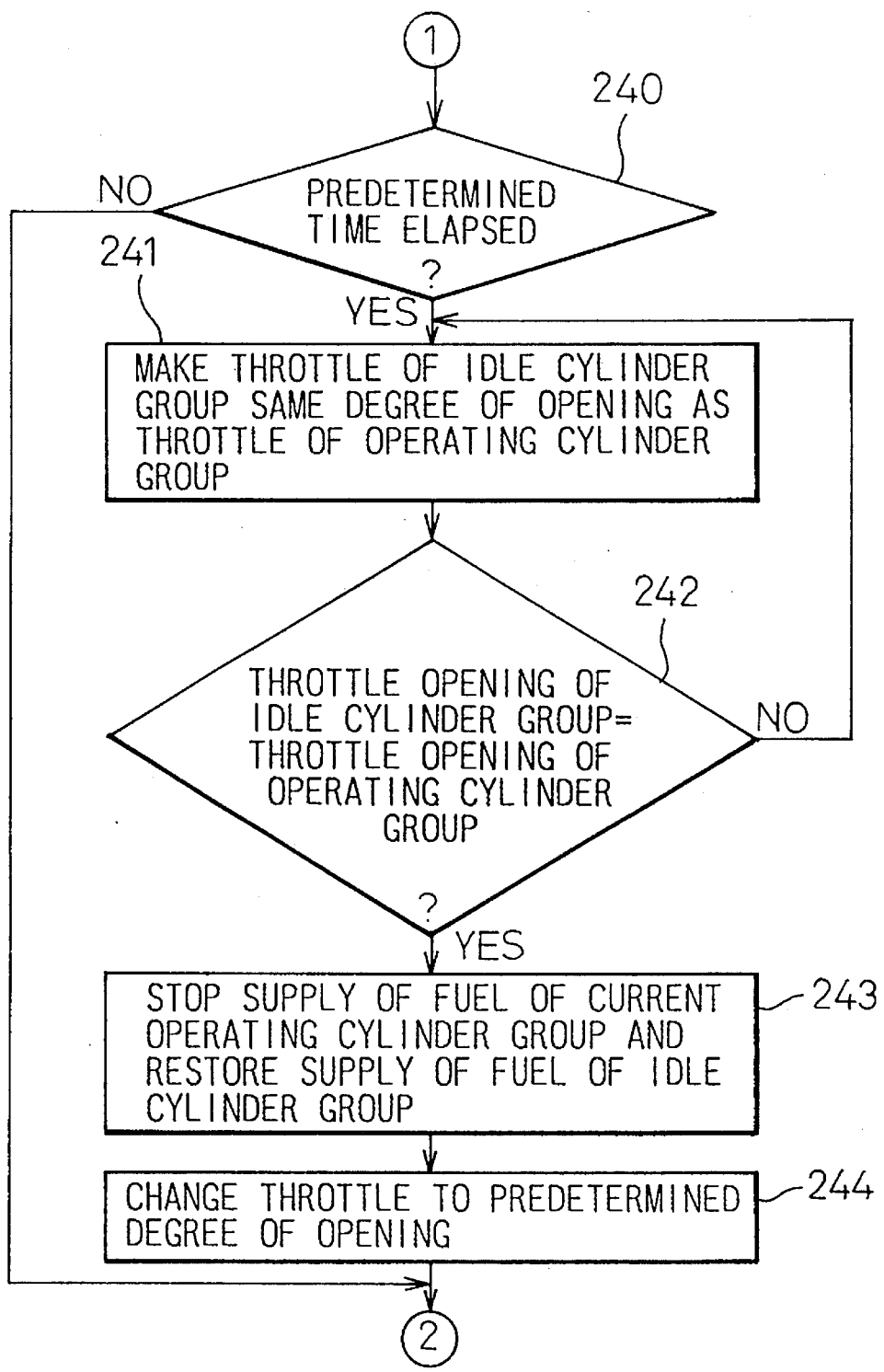
FIG. 21 is a flow chart for the control of the operation of the engine.

Next, an explanation will be made of the second method shown in FIG. 21 and FIG. 22. In the second method, when it is judged at step 206 of FIG. 16 that the partial cylinder operation is being performed, the routine proceeds to step 240 of FIG. 21, where it is judged if a predetermined time has elapsed from the start of the partial cylinder operation. When the predetermined time has not elapsed, the processing cycle is ended. At this time, the degrees of opening of the throttle valves 10a and 10b become the same as the region d of FIG. 17 as shown in the region a of FIG. 22.

Figure 22:
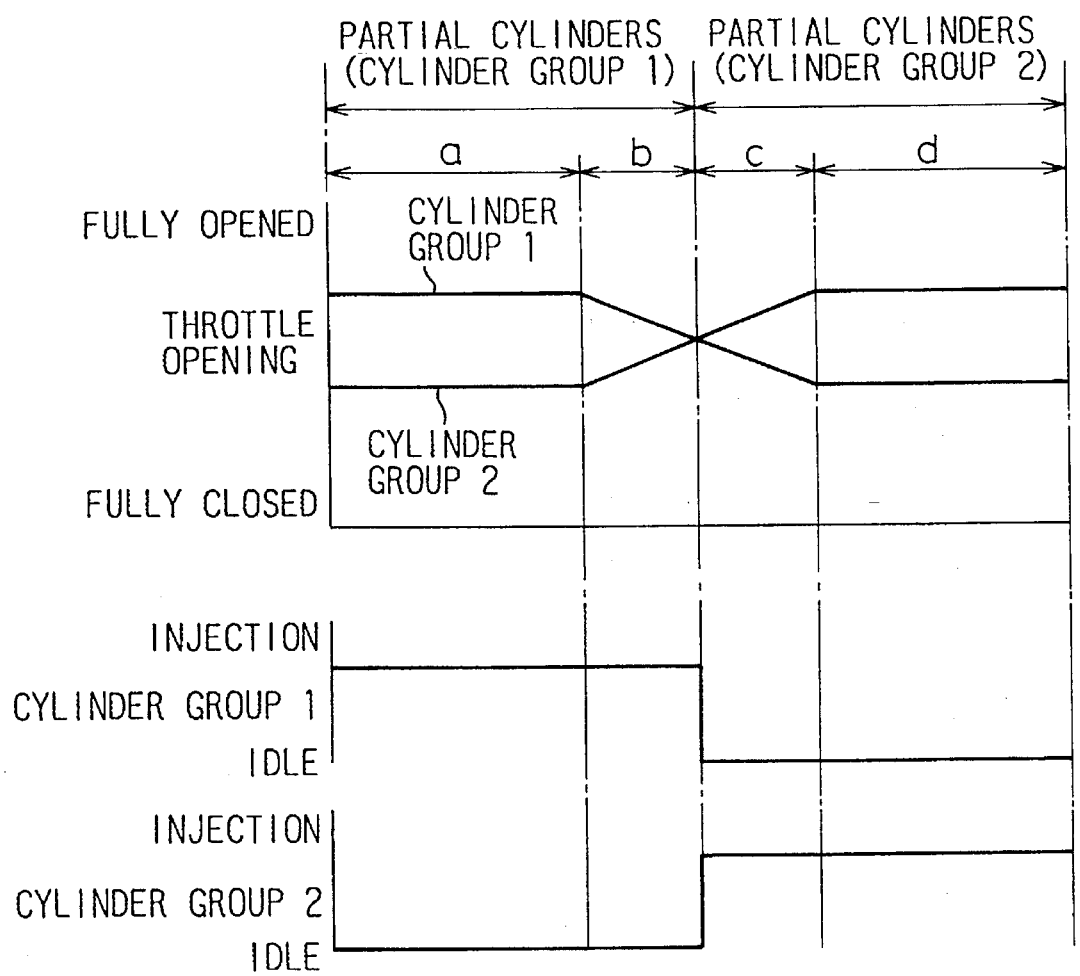
FIG. 22 is a time chart of the changes in the degree of opening of the throttle valve etc.

Next, when it is judged at step 240 that the predetermined time has elapsed, the routine proceeds to step 241, where, as shown by the region b of FIG. 22, the output torque of the engine is maintained constant, the first throttle valve 10a of the cylinder group 1 is gradually closed, and the second throttle valve 10b of the cylinder group 2 is gradually opened.

Next, at step 242, it is judged if the degree of opening of the first throttle valve 10a and the degree of opening of the second throttle valve 10b have become equal. When the degree of opening of the first throttle valve 10a and the degree of opening of the second throttle valve 10b have become equal, the routine proceeds to step 243, where the fuel injection to the cylinder group 1 is stopped and the fuel injection to the cylinder group 2 is started. Therefore, at this time, the engine shifts from the partial cylinder operation by the cylinder group 1 to the partial cylinder operation by the cylinder group 2.

Next, at step 244, as shown by the region c in FIG. 22, the first throttle valve 10a is gradually closed, while the second throttle valve 10b is gradually opened. Next, in the region d of FIG. 22, the partial cylinder operation by the cylinder group 2 is continued.

FIG. 23 to FIG. 26 show various embodiments of structures of the intake system and exhaust system different from the engines shown in FIG. 1 and FIG. 15. Note that in FIG. 23 to FIG. 26, components similar to those in FIG. 1 and FIG. 15 are shown by the same reference numerals.

Figure 23:
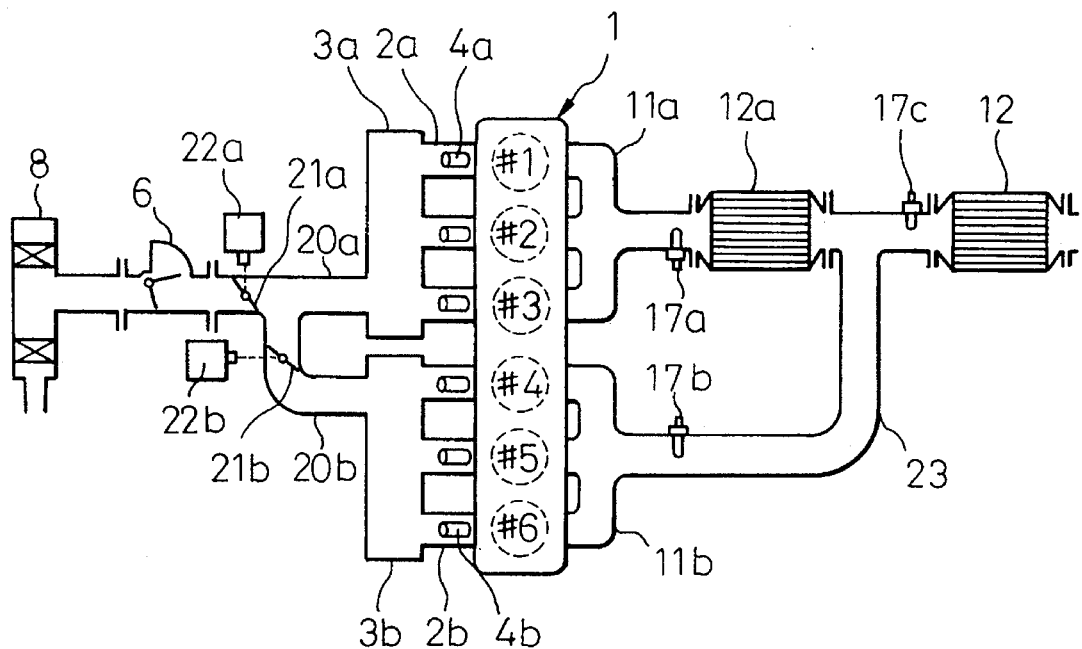
FIG. 23 is an overview of still another embodiment of the internal combustion engine.

First, referring to FIG. 23, in this embodiment, the first surge tank 3a of the cylinder group 1 is connected through a main intake duct 20a to an air flow meter 6. In the main intake duct 20a is disposed a first throttle valve 21a driven by a first drive motor 22a. On the other hand, the second surge tank 3b of the cylinder group is connected through a subsidiary intake duct 20b to the main intake duct 20a downstream of the first throttle valve 21a. In the subsidiary intake duct 20b is disposed a second throttle valve 21b driven by a second drive motor 22b. In this embodiment, further, a three-way catalytic converter 12 is disposed downstream of the three-way catalytic converter 12a, and a second exhaust manifold 11b of the cylinder group 2 is connected through the exhaust pipe 23 to the portion between the three-way catalytic converters 12a and 12. Further, in this embodiment, a third air-fuel ratio sensor 17c in addition to the first air-fuel ratio sensor 17a and the second air-fuel ratio sensor 17b is disposed at the inlet portion of the three-way catalytic converter 12.

In this embodiment, during full cylinder operation, the second throttle valve 21b is fully opened. At that time, the amount of intake air supplied to the cylinder group 1 and the cylinder group 2 is controlled by the first throttle valve 21a. On the other hand, when shifting from full cylinder operation to partial cylinder operation, the sum of the load $(Q/N)_1$ of the cylinder group 1 and the load $(Q/N)_2$ of the cylinder group 2 is maintained at a load substantially the same as the load of the cylinder group 1 just before the shift to the partial cylinder operation, the second throttle valve 21b is gradually closed until close to full closure, and the first throttle valve 21a is gradually opened. Next, when the degree of opening of the second throttle valve 21b becomes less than a predetermined set degree of opening, the fuel injection from the fuel injectors 4b of the cylinder group 2 is stopped and therefore the cylinder group 2 is made idle.

When the cylinder group 2 is made idle, the second throttle valve 21b is opened until the degree of opening giving close to the minimum level of engine vibration. When shifting from partial cylinder operation to full cylinder operation, the degrees of opening of the throttle valves 21a and 21b are changed in a reverse manner from the above changes of degrees of opening. That is, when the second throttle valve 21b is closed to less than the set degree of opening, the fuel injection of the cylinder group 2 is started, then the output torque of the engine is maintained constant and the second throttle valve 21b is fully opened.

Figure 24:
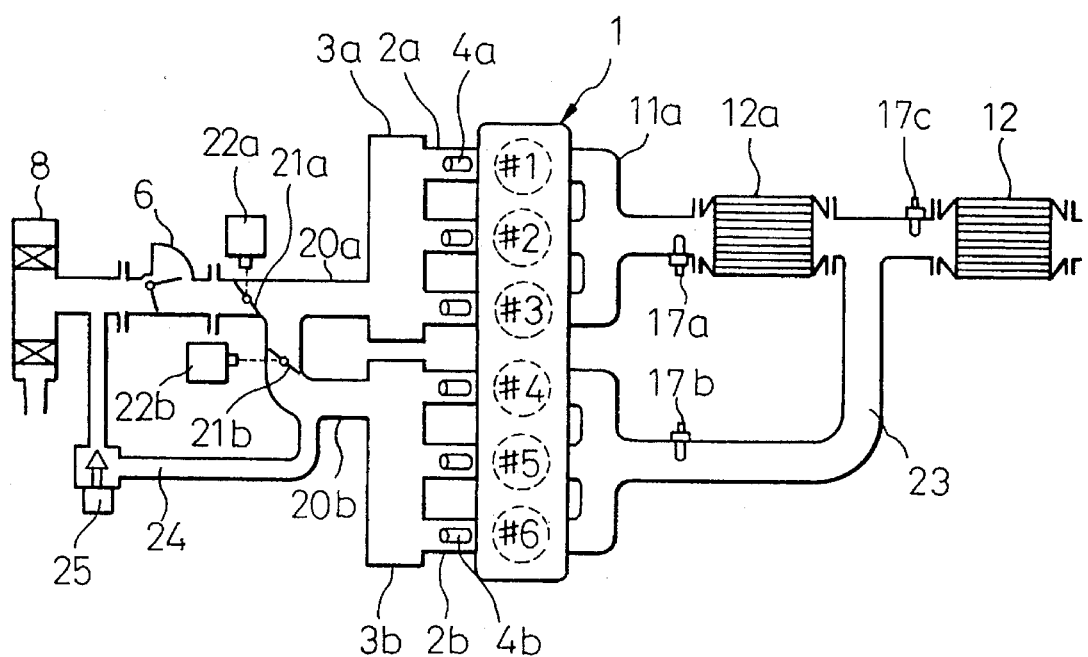
FIG. 24 is an overview of still another embodiment of the internal combustion engine.

In the embodiment shown in FIG. 24, the subsidiary intake duct 20b downstream of the second throttle valve 21b is connected through a bypass passage 24 to the air cleaner 8. A bypass control valve 25 is disposed in this bypass passage 24.

In this embodiment, during full cylinder operation, the bypass control valve 25 is closed, and the second throttle valve 21b is fully opened. At this time, the amount of intake air supplied to the cylinder group 1 and the cylinder group 2 is controlled by the first throttle valve 21a. On the other hand, when shifting from full cylinder operation to partial cylinder operation, in the state with the bypass control valve 25 closed, the sum of the load $(Q/N)_1$ of the cylinder group 1 and the load $(Q/N)_2$ of the cylinder group 2 is maintained at a load substantially the same as the load of the cylinder group 1 just before the shift to the partial cylinder operation, the second throttle valve 21b is gradually closed to close to full closure, and the first throttle valve 21a is gradually opened. Next, when the degree of opening of the second throttle valve 21b becomes less than a predetermined set degree of opening, the fuel injection from the fuel injectors 4b of the cylinder group 2 is stopped and therefore the cylinder group 2 is made idle. When the cylinder group 2 is made idle, the second throttle valve 21b is held in the closed state and the bypass control valve 25 is gradually opened. The bypass control valve 25 is opened until the degree of opening giving close to the minimum level of engine vibration.

Figure 25:
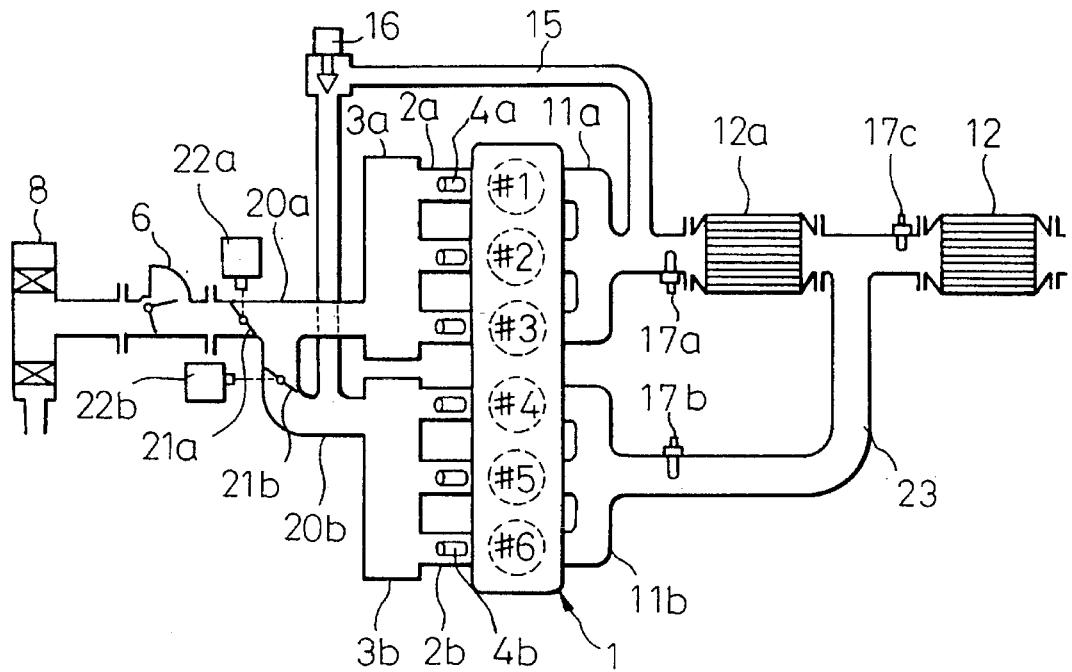
FIG. 25 is an overview of still another embodiment of the internal combustion engine.

In the embodiment shown in FIG. 25, the converging portion of the first exhaust manifold 11a of the cylinder group 1 is connected through a recirculated gas passage 15 to the subsidiary intake duct 20b downstream of the second throttle valve 21b. The recirculation valve 16 is disposed in this recirculated gas passage 15.

In this embodiment, during full cylinder operation, the recirculation valve 16 is closed and the second throttle valve 21b is fully opened. At this time, the amount of intake air supplied to the cylinder group 1 and the cylinder group 2 is controlled by the first throttle valve 21a. On the other hand, when shifting from the full cylinder operation to partial cylinder operation, in the state with the recirculation valve 16 closed, the sum of the load $(Q/N)_1$ of the cylinder group 1 and the load $(Q/N)_2$ of the cylinder group 2 is maintained at a load substantially the same as the load of the cylinder group 1 just before the shift to the partial cylinder operation, the second throttle valve 21b is gradually closed to close to full closure, and the first throttle valve 21a is gradually opened. Next, when the degree of opening of the second throttle valve 21b falls below a predetermined set degree of opening, the fuel injection from the fuel injectors 4b of the cylinder group 2 is stopped and therefore the cylinder group 2 is made idle. When the cylinder group 2 is made idle, the second throttle valve 21b is held in the closed state and the recirculation valve 16 is gradually opened. The recirculation valve 16 is opened to the degree of opening giving close to the minimum level of engine vibration.

Figure 26:
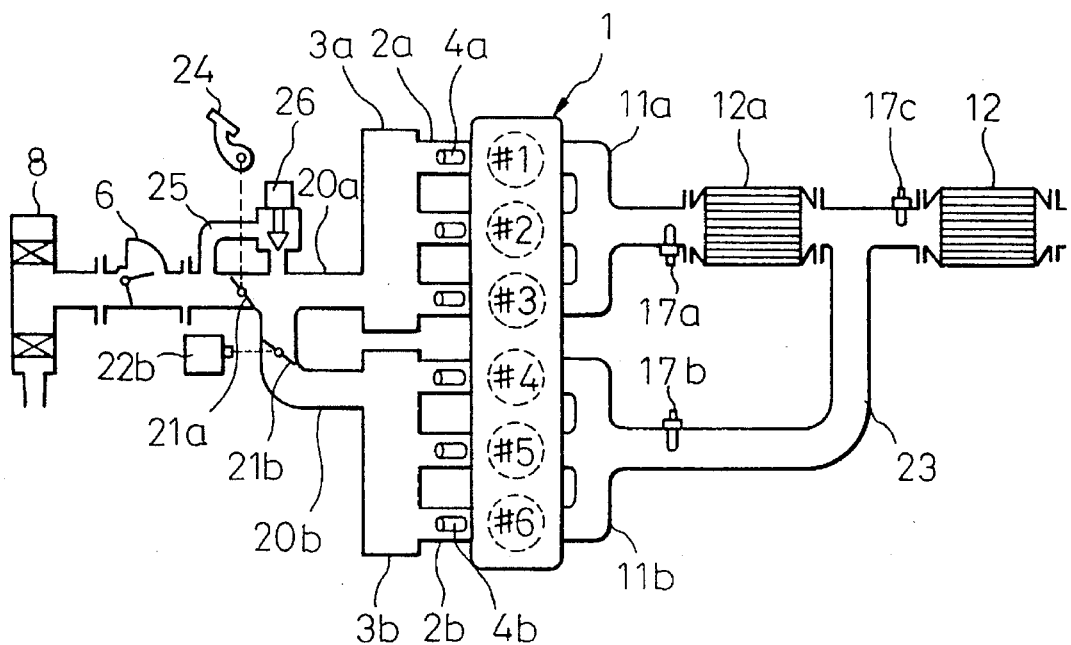
FIG. 26 is an overview of still another embodiment of the internal combustion engine.

In the embodiment shown in FIG. 26, the first throttle valve 21a is connected to the accelerator pedal 24. Accordingly, in this embodiment, the degree of opening of the first throttle valve 21a increases in proportion to the amount of depression of the accelerator pedal 24. Further, in this embodiment, provision is made of a bypass passage 25 connecting the upstream and downstream sides of the first throttle valve 21a. The bypass control valve 26 is disposed in this bypass passage 25.

In this embodiment as well, during full cylinder operation, the second throttle valve 21b is fully opened. At this time, the amount of intake air supplied to the cylinder group 1 and the cylinder group 2 is controlled by the first throttle valve 21a. On the other hand, when shifting from the full cylinder operation to partial cylinder operation, the sum of the load $(Q/N)_1$ of the cylinder group 1 and the load $(Q/N)_2$ of the cylinder group 2 is maintained at a load substantially the same as the load of the cylinder group 1 just before the shift to the partial cylinder operation, the second throttle valve 21b is gradually closed to close to full closure, and the bypass control valve 26 is gradually opened. Next, when the degree of opening of the second throttle valve 21b falls below a predetermined set degree of opening, the fuel injection from the fuel injectors 4b of the cylinder group 2 is stopped and therefore the cylinder group 2 is made idle. When the cylinder group 2 is made idle, the second throttle valve 21b is opened to the degree of opening giving close to the minimum level of engine vibration. In this embodiment, there is the advantage that a single drive motor 22b is enough for driving the throttle valves.

Figure 27:
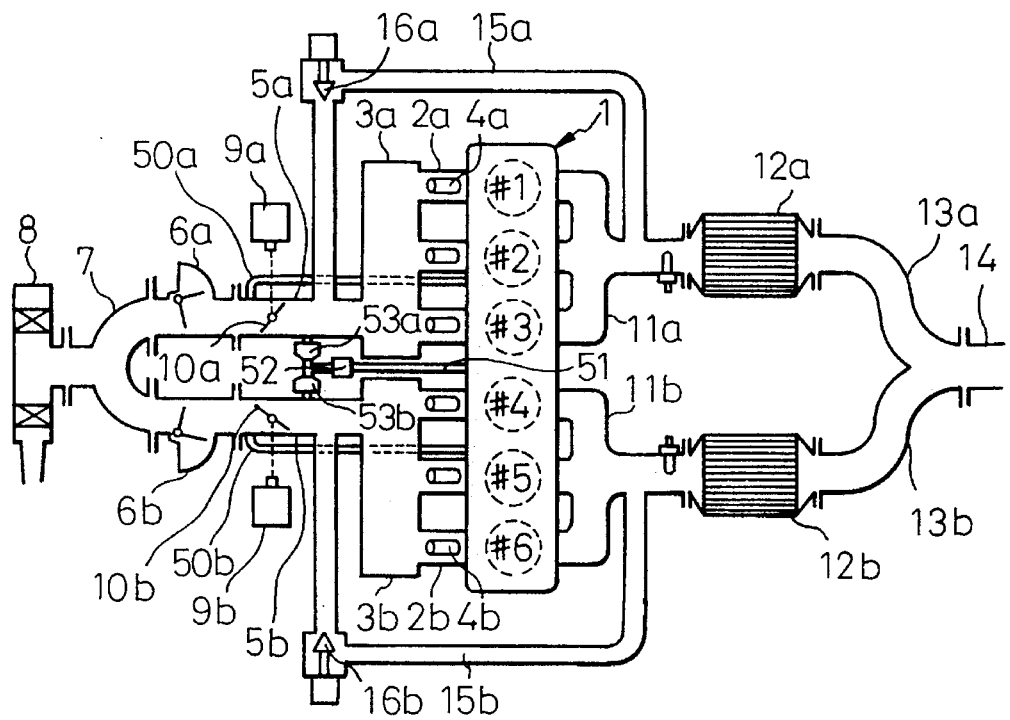
FIG. 27 is an overview of an internal combustion engine provided with a blowby gas feeding device.
Figure 28:
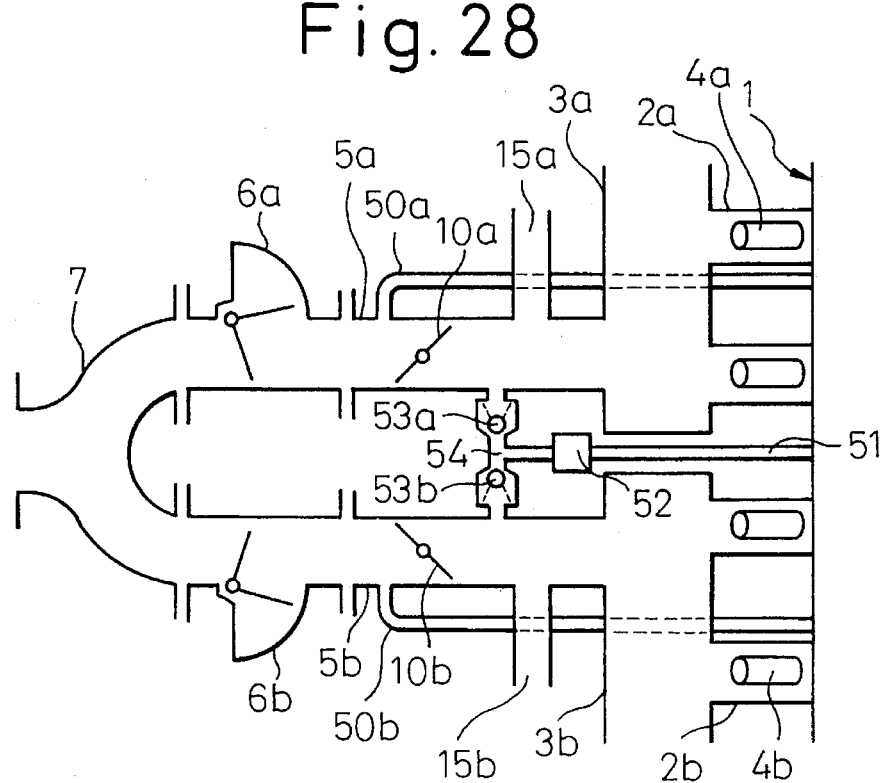
FIG. 28 is a partially enlarged view of FIG. 27.

FIG. 27 and FIG. 28 show a blowby gas supply system incorporated in the engine shown in FIG. 1. In FIG. 27 and FIG. 28, 50a and 50b show air conduits for introducing new air into the crankcase to sweep the inside of the crankcase. The blowby gas produced in the crankcase is fed into the cylinder head, then is exhausted from the cylinder head to a blowby gas supply passage 51. This blowby gas supply passage 51 is connected through a so-called PCV valve 52, which performs control of the flow of the blowby gas, and then, on the one hand, through a first check valve 53a passing gas only toward the first intake duct 5a, to the first intake duct 5a downstream of the first throttle valve 10a and, on the other hand, through a second check valve 53b passing gas only toward a second intake duct 5b, to the second intake duct 5b downstream of the second throttle valve 10b.

The pressure of the blowby gas in the crankcase and the cylinder head becomes substantially atmospheric pressure and therefore the pressure of the blowby gas exhausted into the blowby gas supply passage 51 also becomes substantially the atmospheric pressure. On the other hand, during partial load operation by full cylinder operation, substantially the same negative pressures are produced in the first intake duct 5a downstream of the first throttle valve 10a and in the second intake duct 5b downstream of the second throttle valve 10b and therefore, at this time, the blowby gas is supplied through the first check valve 53a and the second check valve 53b to the first intake duct 5a and the second intake duct 5b.

On the other hand, at the time of partial cylinder operation, for example, when the cylinder group 1 is made to operate and the cylinder group 2 is made idle, as shown by the region d in FIG. 6, the second recirculation valve 16b of the cylinder group 2 is opened wide, so the pressure in the second intake duct 5b downstream of the second throttle valve 10b does not reach atmospheric pressure, but becomes close to atmospheric pressure. That is, the pressure in the second intake duct 5b downstream of the second throttle valve 10b becomes somewhat lower than the pressure of the blowby gas in the blowby gas supply passage 51. As opposed to this, a relatively large negative pressure is produced in the first intake duct 5a downstream of the first throttle valve 10a and therefore the pressure inside the first intake duct 5a downstream of the first throttle valve 10a becomes lower than the pressure in the second intake duct 5b downstream of the second throttle valve 10b.

In this way, at the time of partial cylinder operation, since the above mentioned relationship of pressure is caused, the blowby gas is supplied only through the first check valve 53a to the inside of the first intake duct 5a of the operating cylinder group 1. That is, at the time of partial cylinder operation, as mentioned above, since a relatively large negative pressure is produced in the first intake duct 5a downstream of the first throttle valve 10a, the first check valve 53a is opened and so the blowby gas is supplied through the first check valve 53a to the inside of the first intake duct 5a. When the first check valve 53a is opened, the pressure in the portion of the passage between the first check valve 53a and the second check valve 53b falls and as a result the pressure in this portion of the passage 54 becomes lower than the pressure in the second intake duct 5b downstream of the second throttle valve 10b. Therefore, the second check valve 53b is maintained in the closed state. Accordingly, during partial cylinder operation, the blowby gas is not supplied to the idle cylinder group 2, but is supplied only to the operating cylinder group 1.

When blowby gas is supplied to the idle cylinder group, not only does the problem occur of the fuel mist and oil mist being discharged into the atmosphere, but also the problem occurs that, if the blowby gas is recirculated through the recirculated gas passages 15a and 15b to the idle cylinder group, the fuel mist and the oil mist deposit in the combustion chambers and therefore the exhaust emission becomes poor when the previously idle cylinder group is operated again. However, with the blowby gas supply system as shown in FIG. 27 and FIG. 28, supply of blowby gas to the idle cylinder group is stopped, so there is no danger of the above problems occurring.

According to the present invention, it is possible to suppress the fluctuations of the output torque of the engine at the time of switching between full cylinder operation and partial cylinder operation or when alternating an idle cylinder group when engaged in partial cylinder operation and therefore possible to ensure smooth operation of the vehicle.

While the invention has been described by reference to specific embodiments chosen for purposes of illustration, it should be apparent that numerous modifications could be made thereto by those skilled in the art without departing from the basic concept and scope of the invention.

We claim:

1. A control device of an engine in which cylinders of the engine are divided into a first cylinder group and a second cylinder group, each of the cylinder groups is made to operate when full cylinder operation is to be performed, and one of the cylinder groups is made to operate and the remaining cylinder group is made idle when partial cylinder operation is to be performed, said control device comprising:

first intake air control means for controlling the amount of intake air supplied to the first cylinder group;

second intake air control means for controlling the amount of intake air supplied to the second cylinder group, said first intake air control means and said second intake air control means maintaining the sum of the load of the first cylinder group and the load of the second cylinder group at a load substantially equal to the total load of all of the cylinders just before shifting to a partial cylinder operation, gradually increasing the amount of intake air supplied to the first cylinder group, gradually reducing the amount of intake air supplied to the second cylinder group when shifting from full cylinder operation to a partial cylinder operation in which the second cylinder group is made idle; and operation control means for idling the second cylinder group when the load of the second cylinder group falls below a predetermined load after the shifting operation from the full cylinder operation to the partial cylinder operation is started.

2. A control device according to claim 1, wherein said second intake air control means increases the amount of intake air supplied to the second cylinder group to a predetermined amount determined by the operating state of the engine after idling the second cylinder group and shifting to the partial cylinder operation.

3. A control device according to claim 1, wherein said first intake air control means and said second intake air control means maintain the sum of the load of the first cylinder group and the load of the second cylinder group at a load substantially equal to the load of the first cylinder group just before shifting to a full cylinder operation, gradually decrease the amount of intake air supplied to the first cylinder group, and gradually increase the amount of intake air supplied to the second cylinder group when shifting from partial cylinder operation where the second cylinder group is idle to full cylinder operation.

4. A control device according to claim 1, wherein first recirculated gas control means is provided for controlling the amount of recirculated gas to be recirculated from an exhaust passage of the first cylinder group to the first cylinder group, and second recirculated gas control means is provided for controlling the amount of recirculated gas to be recirculated from an exhaust passage of the second cylinder group to the second cylinder group, said first intake air control means, said second intake air control means, said first recirculated gas control means, and said second recirculated gas control means maintaining the sum of the load of the first cylinder group and the load of the second cylinder group at a load substantially equal to the total load of all of the cylinders just before shifting to a partial cylinder operation, gradually increasing the amount of intake air supplied to the first cylinder group and the amount of recirculated gas to be recirculated to the first cylinder group, and gradually reducing the amount of intake air supplied to the second cylinder group and the amount of recirculated gas to be recirculated to the second cylinder group when shifting from full cylinder operation to a partial cylinder operation in which the second cylinder group is made idle.

5. A control device according to claim 4, wherein said second recirculated gas control means increases the amount of recirculated gas to be recirculated to the second cylinder group to a predetermined amount determined by the operating state of the engine after idling the second cylinder group and shifting to the partial cylinder operation.

6. A control device according to claim 4, wherein said first intake air control means, said second intake air control means, said first recirculated gas control means, and said second recirculated gas control means maintain the sum of the load of the first cylinder group and the load of the second cylinder group at a load substantially equal to the load of the first cylinder group just before shifting to a full cylinder operation, gradually decrease the amount of intake air supplied to the first cylinder group and the amount of recirculated gas to be recirculated to the first cylinder group, and gradually increase the amount of intake air supplied to the second cylinder group and the amount of recirculated gas to be recirculated to the second cylinder group when shifting from partial cylinder operation where the second cylinder group is idle to full cylinder operation.

7. A control device according to claim 1, wherein said operation control means alternately idles the first cylinder group and the second cylinder group and performs full cylinder operation when shifting from a partial cylinder operation in which one cylinder group is idle to a partial cylinder operation in which the other cylinder group is idle and, during the shift, said first intake air control means and said second intake air control means maintain the sum of the load of the one cylinder group and the load of the other cylinder group at a load substantially equal to the load of the other cylinder group just before the shift, gradually decrease the amount of intake air supplied to the other cylinder group, and gradually increase the amount of intake air supplied to the one cylinder group.

8. A control device according to claim 7, wherein first recirculated gas control means is provided for controlling the amount of recirculated gas to be recirculated from an exhaust passage of the first cylinder group to the first cylinder group, and second recirculated gas control means is provided for controlling the amount of recirculated gas to be recirculated from an exhaust passage of the second cylinder group to the second cylinder group, the recirculating action of the recirculated gas to the first cylinder group and the second cylinder group being stopped when shifting from a partial cylinder operation in which one cylinder group is idle to a partial cylinder operation in which the other cylinder group is idle.

9. A control device according to claim 1, wherein said cylinder operation control means alternately idles the first cylinder group and the second cylinder group and, when shifting from a partial cylinder operation in which one cylinder group is idle to a partial cylinder operation in which the other cylinder group is idle, in the state where the one cylinder group is idled and the other cylinder group is operated, said first intake air control means and said second intake air control means maintain the load of the other cylinder group at a load substantially equal to the load of the other cylinder group just before the shift and gradually increase the amount of intake air supplied to both cylinder groups, then, in the state where the one cylinder group is operated and the other cylinder group is idled, said first intake air control means and said second intake air control means maintain the load of the one cylinder group at a load substantially the same as the load of the other cylinder group just before the shift and gradually decrease the amount of intake air supplied to both cylinder groups.

10. A control device according to claim 1, wherein first recirculated gas control means is provided for controlling the amount of recirculated gas to be recirculated from an exhaust passage of the first cylinder group to the first cylinder group, and second recirculated gas control means is provided for controlling the amount of recirculated gas to be recirculated from an exhaust passage of the second cylinder group to the second cylinder group and, when shifting from partial cylinder operation in which one cylinder group is made idle to a partial cylinder operation in which the other cylinder group is made idle, in the state where the one cylinder group is idled and the other cylinder group is operated, said first intake air control means, said second intake air control means, said first recirculated gas control means, and said second recirculated gas control means maintain the load of the other cylinder group at a load substantially equal to the load of the other cylinder group just before the shift, gradually increase the amount of intake air supplied to both cylinder groups, and gradually decrease the amount of recirculated gas to be recirculated to both cylinder groups, then, in the state where the one cylinder group is operated and the other cylinder group is idled, said first intake air control means, said second intake air control means, said first recirculated gas control means, and said second recirculated gas control means maintain the load of the one cylinder group at a load substantially the same as the load of the other cylinder group just before the shift, gradually decrease the amount of intake air supplied to both cylinder groups, and gradually increase the amount of recirculated gas to be recirculated to both cylinder groups.

11. A control device according to claim 1, wherein the first cylinder group and the second cylinder group are each provided with independent exhaust passages, and the catalysts having reduction functions are disposed in the exhaust passages.

12. A control device according to claim 1, wherein a first catalyst having a reduction function is disposed in a first exhaust passage connected to the first cylinder group, a second catalyst having a reduction function is disposed in a second exhaust passage connected to the second cylinder group, the first exhaust passage and the second exhaust passage are converged downstream of the first catalyst and the second catalyst, and the length of the passage from the converging portion to the catalysts is made a length of passage at least one not causing a decrease of the reduction capability of the catalyst of the operating cylinder group due to the gas passing through the catalyst of the idle cylinder group.

13. A control device according to claim 1, wherein blowby gas supply control means is provided for preventing the supply of the blowby gas exhausted from the engine to the idle cylinder group and supplying it only to the operating cylinder group.

14. A control device of an engine in which cylinders of the engine are divided into a first cylinder group and a second cylinder group, each of the cylinder groups is made to operate when full cylinder operation is to be performed, and one of the cylinder groups is made to operate and the remaining cylinder group is made idle when partial cylinder operation is to be performed, said control device comprising:

first intake air control means for controlling the amount of intake air supplied to the first cylinder group and the second cylinder group;

second intake air control means for controlling the amount of intake air supplied to the second cylinder group, said first intake air control means and said second intake air control means maintaining the sum of the load of the first cylinder group and the load of the second cylinder group at a load substantially equal to the total load of all of the cylinders just before shifting to a partial cylinder operation, gradually increasing the amount of intake air supplied to the first cylinder group, gradually reducing the amount of intake air supplied to the second cylinder group when shifting from full cylinder operation to a partial cylinder operation in which the second cylinder group is made idle; and operation control means for idling the second cylinder group when the load of the second cylinder group falls below a predetermined load after the shifting operation from the full cylinder operation to the partial cylinder operation is started.

* * * * *